(12) United States Patent
Szul et al.

(10) Patent No.: US 11,655,722 B1
(45) Date of Patent: May 23, 2023

(54) SEAL ASSEMBLY AND SEALING METHOD

(71) Applicant: General Electric Company, Schenectady, NY (US)

(72) Inventors: Dale Szul, West Chester, OH (US); Donald M. Corsmeier, West Chester, OH (US); Bernard J. Renggli, Cincinnati, OH (US); Andrew Keppeler, Mason, OH (US); Steven Kirgiss, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/578,717

(22) Filed: Jan. 19, 2022

(51) Int. Cl.
*F01D 11/00* (2006.01)
*F01D 25/24* (2006.01)
(Continued)

(52) U.S. Cl.
CPC .............. *F01D 11/005* (2013.01); *F01D 9/02* (2013.01); *F01D 25/246* (2013.01); *F02C 7/28* (2013.01); *F16J 15/0887* (2013.01); *F05D 2220/32* (2013.01); *F05D 2230/60* (2013.01); *F05D 2240/57* (2013.01); *F05D 2300/6033* (2013.01)

(58) Field of Classification Search
CPC ........ F01D 11/005; F01D 9/02; F01D 25/246; F02C 7/28; F16J 15/00; F16J 15/0887; F16J 15/32–3296; F05D 2220/32; F05D 2230/60; F05D 2240/55; F05D 2240/57; F05D 2300/6033; F02K 1/12; F02K 1/805

See application file for complete search history.

(56) References Cited

U.S. PATENT DOCUMENTS 3,121,995 A 2/1964 Albani
3,167,206 A 1/1965 Nelson
(Continued)

FOREIGN PATENT DOCUMENTS

DE 3026245 C1 11/1997
EP 1491931 A1 12/2004
(Continued)

OTHER PUBLICATIONS

USPTO; U.S. Appl. No. 17/407,439, Application filed Aug. 20, 2021, entitled "Plunger Seal Assembly and Sealing Method,".
(Continued)

*Primary Examiner* — Loren C Edwards
(74) *Attorney, Agent, or Firm* — Fitch, Even, Tabin & Flannery LLP

(57) ABSTRACT

Apparatuses and methods are provided herein useful to sealing a dynamic gap between a moveable flap and a sidewall. The apparatus may be a seal assembly that includes a spring body, a clip coupled to a distal end of the spring body, and a wear shoe coupled to the clip. The spring body includes a flap arm adjacent the flap and a wall arm adjacent the sidewall. The flap arm and the wall arm bias away from one another when under compression in the gap. A distal end of the wall arm includes a first knuckle and a second knuckle that are pivotally coupled to the clip to create a hinge feature. The wear shoe is pivotally coupled to the clip to create another hinge feature. A distal end of the flap arm includes a skirt that is received by the clip seal an interior space of the spring body.

20 Claims, 14 Drawing Sheets

(51) Int. Cl.
*F01D 9/02* (2006.01)
*F02C 7/28* (2006.01)
*F16J 15/08* (2006.01)

(56) References Cited

U.S. PATENT DOCUMENTS

| | | | |
|---|---|---|---|
| 3,422,981 A | 1/1969 | Obrien | |
| 4,575,006 A * | 3/1986 | Madden | F16J 15/00 239/265.29 |
| 4,575,099 A * | 3/1986 | Nash | F16J 15/3204 277/345 |
| 4,739,932 A | 4/1988 | Szuminski | |
| 4,815,276 A | 3/1989 | Hansel | |
| 4,917,302 A | 4/1990 | Steinetz | |
| 5,115,979 A | 5/1992 | Ellerhorst | |
| 5,143,292 A * | 9/1992 | Corsmeier | F02K 1/12 239/127.3 |
| 5,288,020 A | 2/1994 | Pirker | |
| 5,323,965 A | 6/1994 | Froemming | |
| 5,417,441 A | 5/1995 | Hill | |
| 5,522,546 A | 6/1996 | Jarvis | |
| 5,676,312 A | 10/1997 | Lapergue | |
| 6,702,300 B1 | 3/2004 | Steinetz | |
| 7,775,048 B2 | 8/2010 | Grammel, Jr. | |
| 9,016,695 B2 | 4/2015 | Treat | |
| 9,103,298 B2 | 8/2015 | Gormley | |
| 9,341,120 B2 | 5/2016 | Barry, Jr. | |
| 9,810,085 B2 | 11/2017 | McMahon | |
| 10,513,939 B2 | 12/2019 | Roberge | |
| 10,550,707 B2 | 2/2020 | Boeck | |
| 10,969,015 B2 | 4/2021 | George | |
| 11,047,481 B2 | 6/2021 | Bidkar | |
| 2008/0000236 A1 | 1/2008 | Grammel | |
| 2013/0033005 A1 | 2/2013 | Treat | |
| 2016/0076391 A1 | 3/2016 | Guinn | |
| 2017/0146130 A1 | 5/2017 | Yanagisawa | |
| 2018/0202659 A1 | 7/2018 | Stieg | |
| 2018/0328313 A1 | 11/2018 | Senofonte | |
| 2018/0335143 A1 | 11/2018 | George | |
| 2019/0170007 A1 * | 6/2019 | Davis | F01D 25/246 |
| 2019/0203842 A1 | 7/2019 | Bidkar | |
| 2022/0042423 A1 | 2/2022 | Hopper | |
| 2022/0403798 A1 | 12/2022 | Shealy | |
| 2022/0412266 A1 | 12/2022 | Shealy | |
| 2022/0412464 A1 | 12/2022 | Shealy | |
| 2023/0054950 A1 | 2/2023 | Shealy | |

FOREIGN PATENT DOCUMENTS

| | | |
|---|---|---|
| EP | 2511481 | 10/2012 |
| EP | 3744964 | 12/2020 |
| EP | 4086436 | 11/2022 |
| KR | 100440720 A | 3/2003 |

OTHER PUBLICATIONS

USPTO; U.S. Appl. No. 17/407,439; Non-Final Office Action dated Dec. 9, 2022; (p. 15).

USPTO; U.S. Appl. No. 17/567,385; Application filed Jan. 3, 2022, entitled "Plunger Seal Apparatus and Sealing Method".

USPTO; U.S. Appl. No. 17/352,605; Notice of Allowance and Fees Due (PTOL-85) dated Jan. 18, 2023; (pp. 1-9).

USPTO; U.S. Appl. No. 17/361,479; Notice of Allowance and Fees Due (PTOL-85) dated Jan. 31, 2023; (pp. 1-9).

USPTO; U.S. Appl. No. 17/361,479; Notice of Allowance and Fees Due (PTOL-85) dated Feb. 6, 2023; (pp. 1-2).

USPTO; U.S. Appl. No. 17/362,391; Non-Final Rejection dated Jan. 31, 2023; (pp. 1-8).

USPTO; U.S. Appl. No. 17/567,385; Non-Final Office Action dated Mar. 8, 2023; (p. 9).

* cited by examiner

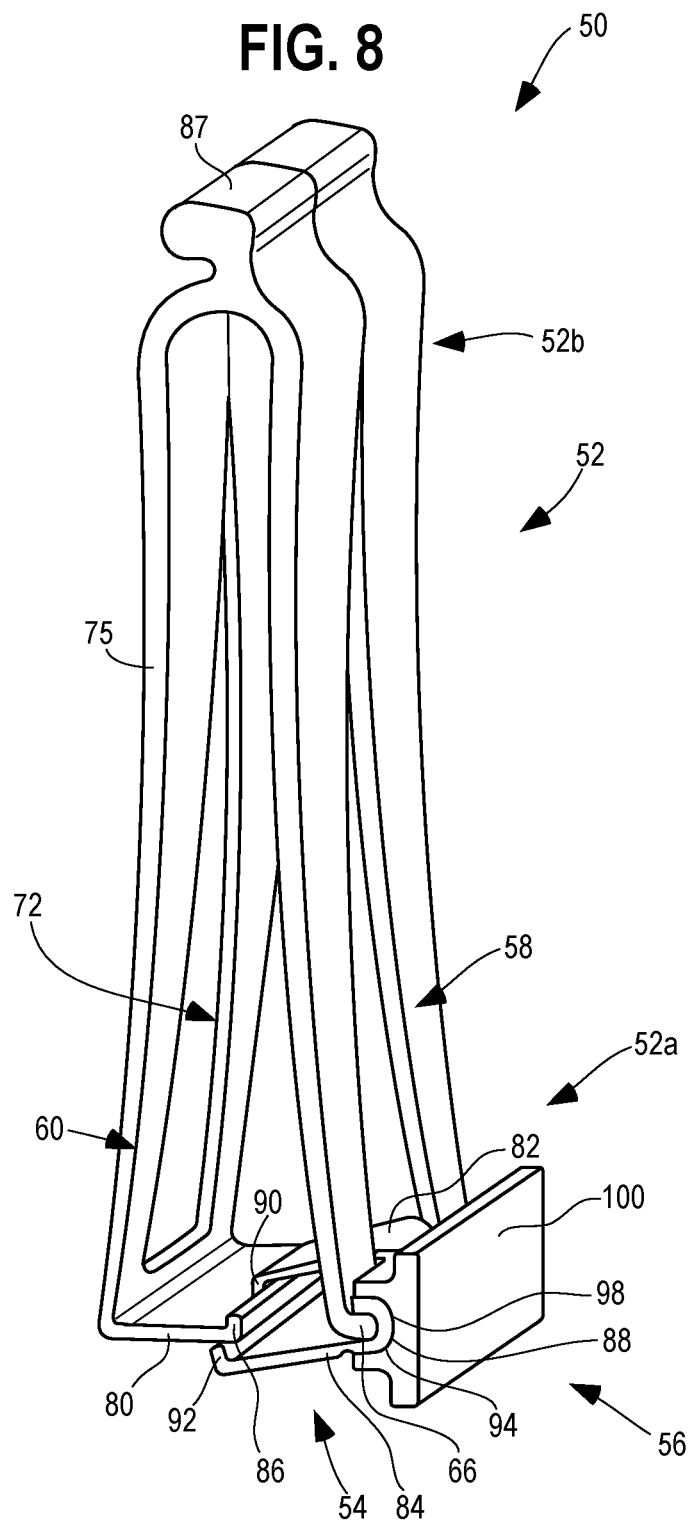

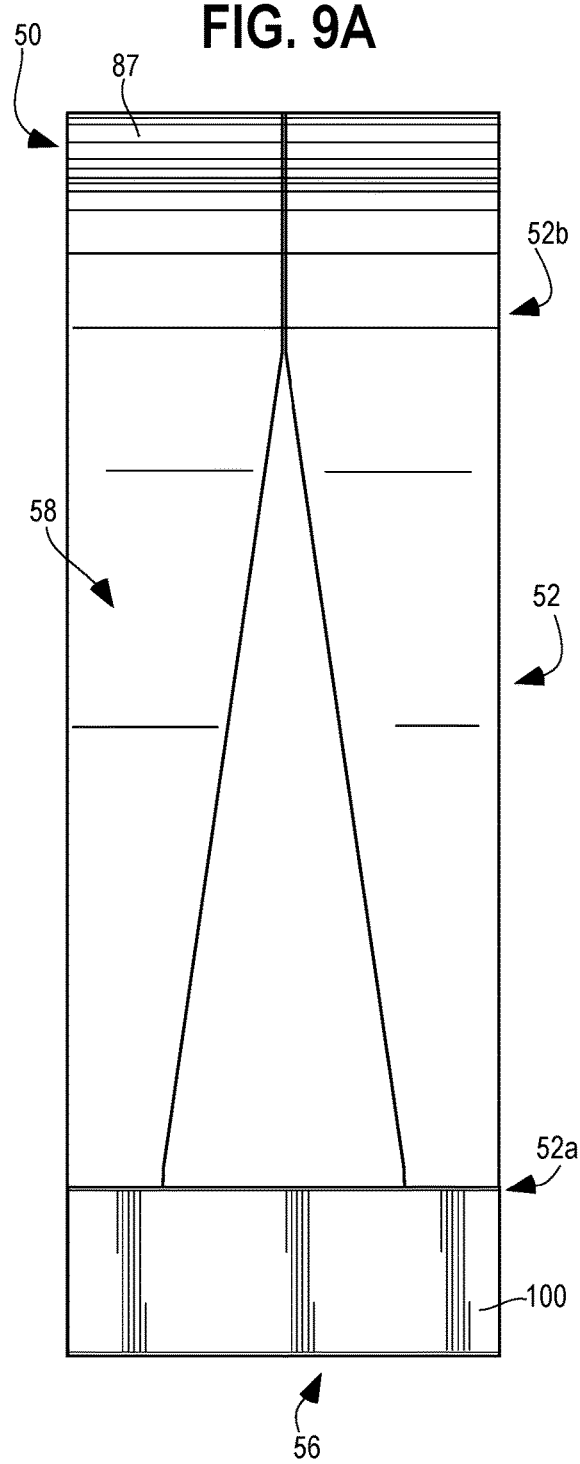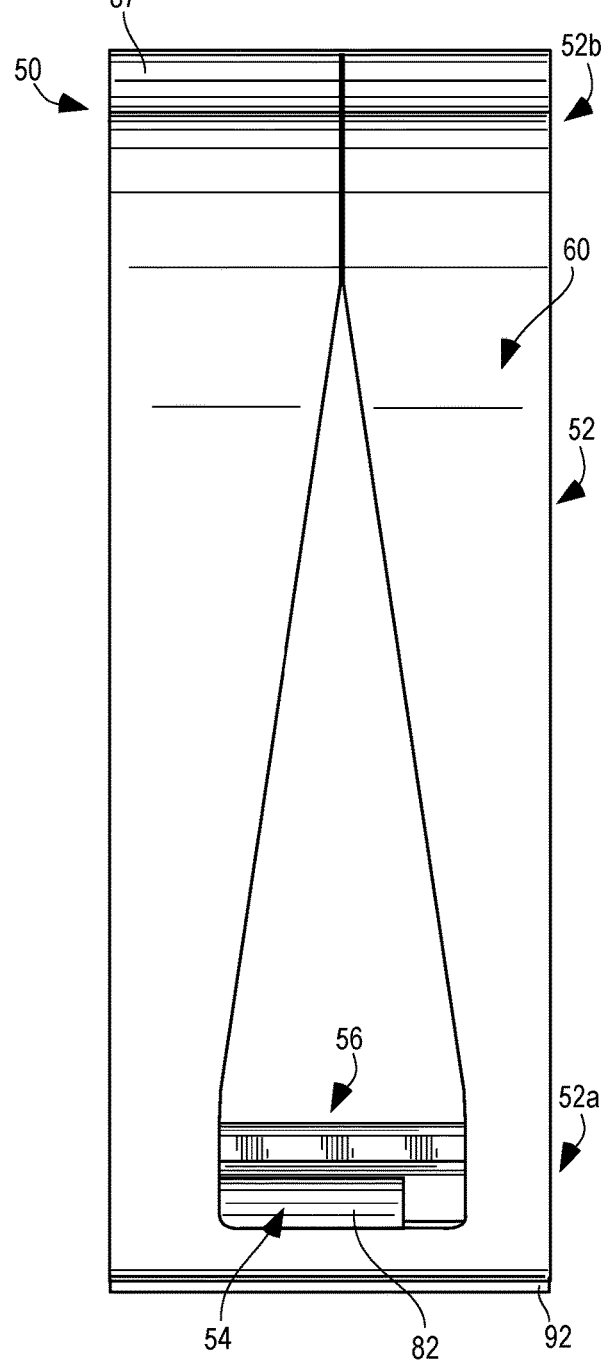

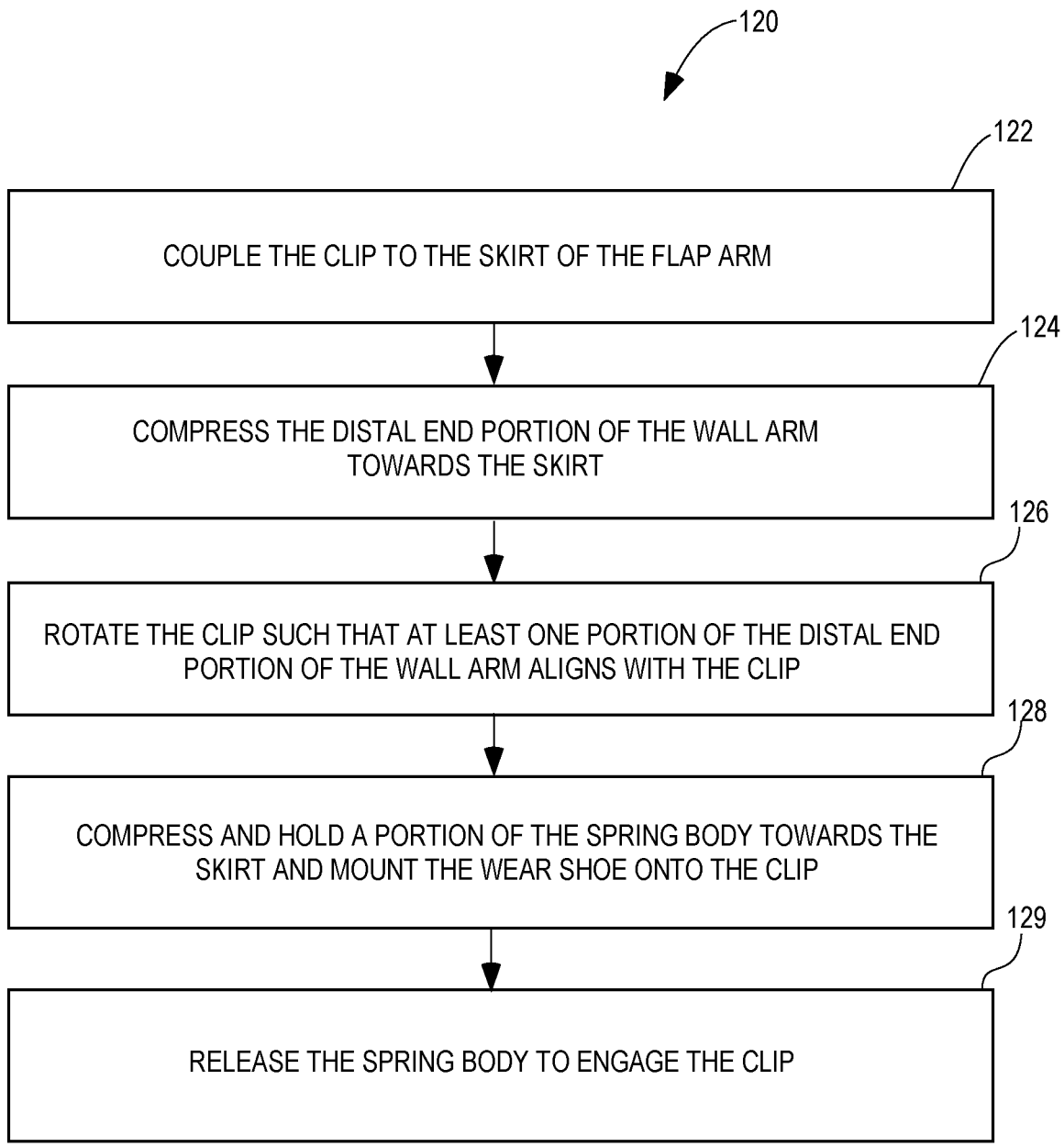

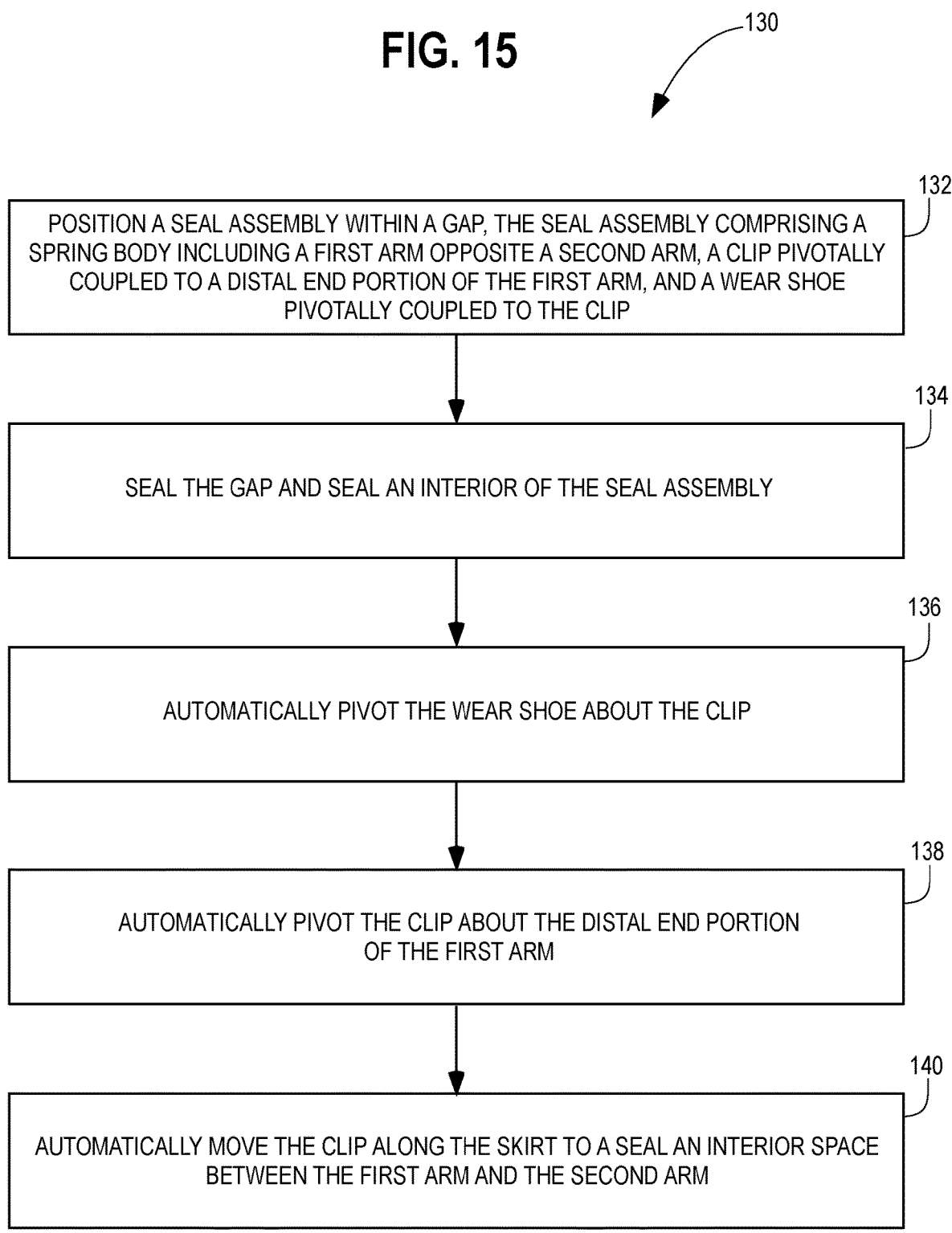

SEAL ASSEMBLY AND SEALING METHOD

GOVERNMENT INTERESTS

This invention was made with United States Government support. The Government has certain rights to this invention.

TECHNICAL FIELD

This technical field relates generally to dynamic seals for sealing a gap between a moveable component and a stationary structure and, more specifically, to dynamic seals usable in a gas turbine engine exhaust nozzle.

BACKGROUND

A gas turbine engine, such as a gas turbine engine for powering an aircraft, may include an exhaust nozzle downstream of the turbine. The exhaust nozzle may include a moveable flap positioned between the nozzle sidewalls. The flap may be actuated via a series of linkages to control a two-dimensional area within the nozzle to direct and accelerate the flow of core air from the engine for the purpose of thrust. Gaps between the flap and the sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 8 is a perspective view of a seal assembly, in accordance with some embodiments.

FIG. 9A is a front, side elevation view of the seal assembly of FIG. 8.

FIG. 9B is a rear, side elevation view of the seal assembly of FIG. 8.

FIG. 14 is a flow chart diagram illustrating a method of assembling the seal assembly of FIG. 8, in accordance with some embodiments.

FIG. 15 is flow chart diagram of a method of sealing a gap using a seal assembly, according to some embodiments.

Figure 1:
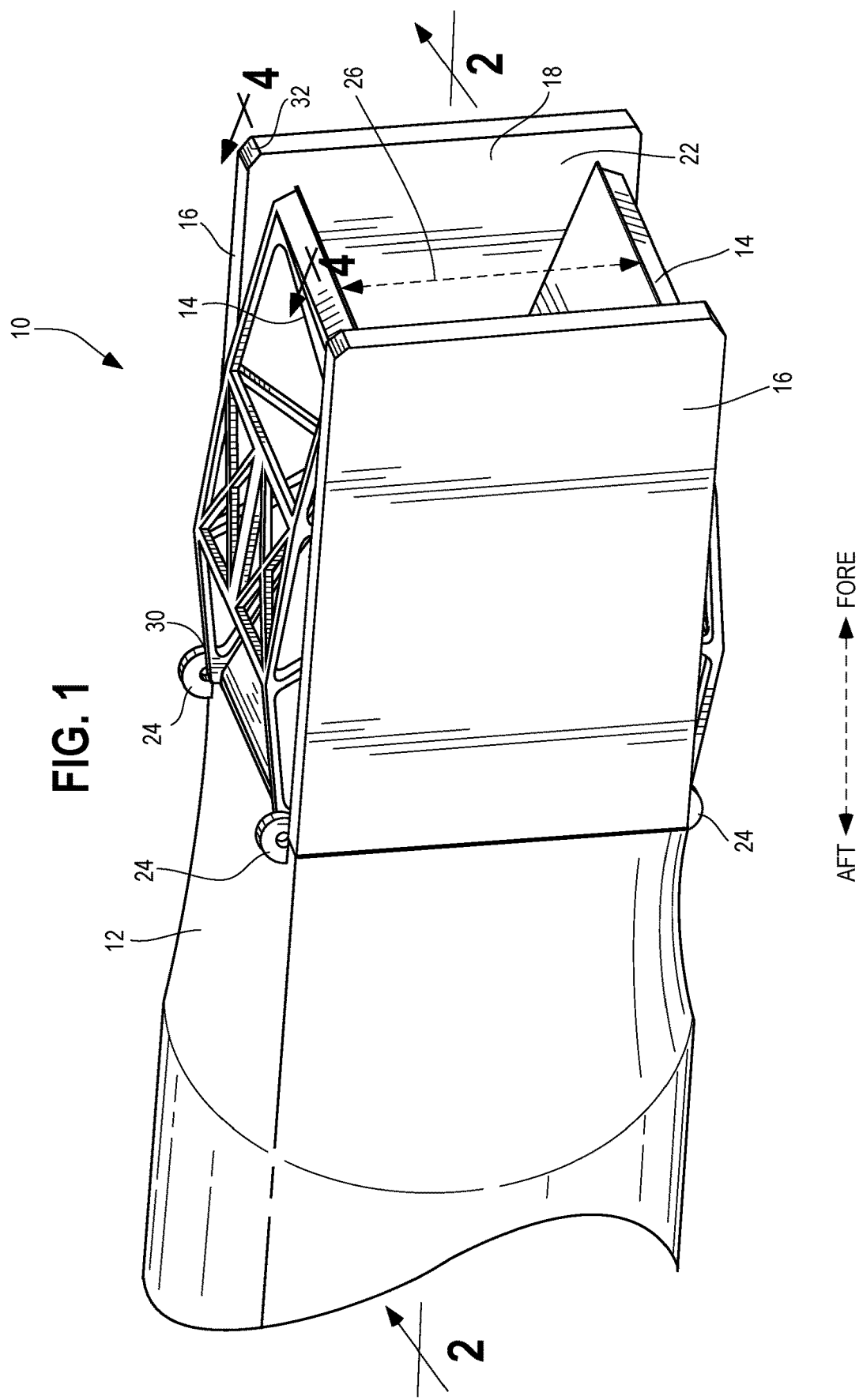
FIG. 1 is a perspective view of an exemplary gas turbine engine exhaust nozzle assembly, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To eliminate or reduce the size of the gaps between the flap and the sidewalls and to seal core air within the nozzle core, a seal assembly may be positioned between the flap and the sidewall. In some instances, liners may be mounted to the sidewalls via one or more hangar structures. When the sidewall includes a sidewall liner, a seal assembly may be positioned between the flap and the sidewall liner, such that the seal assembly seals against the sidewall liner rather than directly to the sidewall.

During operation of the nozzle, the flap may move in one or more directions relative to the sidewall. Thus, the seal assembly for the gap between the flap and the sidewall may need to facilitate sliding motion. For example, the seal assembly may need to facilitate the sliding of the seal assembly along the sidewall while still maintaining a seal between the flap and the sidewall.

In addition to accommodating sliding motion along the sidewall, the seal assembly may also need to accommodate dynamic variations in the size of the gap between the flap and the sidewall and/or the sidewall liner. For example, the sidewall liner may distort or move due to pressure and temperature variations within the nozzle. In addition, although generally stationary, the sidewall may also deflect or shift towards or away from the flap. Such distortions may impact the size of the gap between the flap and the sidewall and/or the sidewall liner. Accordingly, the seal assembly may need to accommodate for variations in the size of the gap between the flap and the sidewall and/or the liner.

Leaf seals may be used to seal the gap between the flap and the sidewall and/or the sidewall liner. However, leaf seals may expose structure behind the seal to core air, as pressure gradients in the nozzle drive core air into the cavity behind the leaf. In some cases, this may require purge air and use of additional shielding and/or baffling to protect the structure and hardware behind the leaf. Similarly, when the leaf seal includes a skirt to discourage core air entrainment behind the leaf, attempts to seal the skirt itself may add additional smaller and more sensitive seals that still must cope with high thermal variation, relative motion, acoustic, and pressure loads. These secondary seals must perform in a similar environment and to similar motion requirements as the primary leaf seal, while typically having less space to do so.

Therefore, there remains a desire to have a dynamic seal that more effectively and efficiently controls or prohibits core air from flowing both to the ambient environment at the nozzle and into the structure of the dynamic seal itself, while minimizing the weight, performance loss, or hardware complexity involved in adding secondary seals and/or purge air.

With reference to FIGS. 1-4, there is illustrated a gas turbine engine 12 that produces core air flow. A nozzle assembly 10 is positioned at the aft of the gas turbine engine 12 to control the effect of the discharged core air. The nozzle assembly 10 includes flaps 14 mounted for movement relative to one another between two opposing corresponding sidewalls 16. A gap 42 is located between outer edges of the flaps 14 and the sidewalls 16. Without seals, the gap 42 may allow air to exhaust inefficiently to the ambient surroundings.

As illustrated in FIGS. 5-11, a seal assembly 50 controls or even prevents this core air from exhausting from the nozzle core 22 to the ambient surroundings when installed in the gap 42. The seal assembly 50 includes a spring body 52, a clip 54 coupled to a distal end portion 52a of the spring body 52, and a wear shoe 56 coupled to the clip 54. The spring body 52 includes a flap arm 60 and a wall arm 58. At least a portion of the spring body 52 exerts a force to urge at least one of the flap arm 60 and the wall arm 58 away from the other. When installed in the gap 42, the flap arm 60 is adjacent the flap 14 and the wall arm 58 that is adjacent the sidewall 16. The spring body 52 is resilient such that the flap arm 60 and the wall arm 58 bias away from one another when under compression in the gap 42. A distal end portion 64 of the wall arm 58 includes a first knuckle 66 and a second knuckle 68. The first knuckle 66 and the second knuckle 68 are pivotally coupled to the clip 54 to create a pivot joint or hinge feature. The wear shoe 56 is pivotally coupled to the clip 54 to create another pivot joint or hinge feature. When installed in the gap 42, the flap arm 60 engages the flap 14 and the wear shoe 56 engages the sidewall 16 to seal the gap 42. A distal end portion 76 of the flap arm 60 includes a skirt 80 that is received by the clip 54 control or prevent core air from entering an interior space 72 between the flap arm 60 and the wall arm 58 at a fifth surface of contact 105. The resilient nature of the spring body 52 allows the flap arm 60 and the wall arm 58 to adapt to motion of the gap 42 created by the sidewalls 16.

The hinge features of the seal assembly 50 enable pivot motion between the spring body 52 and the clip 54, sealing contact between the clip 54 and the wear shoe 56, and sealing contact between the wear shoe 56 and the sidewall 16. The hinge features and multi-component design of the seal assembly 50 may also provide additional flexibility in thermal growth, binding, and differential pressure when the seal assembly 50 is under operating conditions.

Turning back to FIG. 1, the gas turbine engine 12 discharges exhaust gases, also referred to as core air, into the nozzle assembly 10. The nozzle assembly 10 may include one or more flaps 14 and one or more sidewalls 16. In this exemplary embodiment, the nozzle assembly 10 includes sidewalls 16, which are flat and opposite each other, and flaps 14, which are opposite each other. In some embodiments, one or more of the sidewalls 16 further include a liner 18 mounted to the sidewall via one or more hangers 20 (not shown). The flaps 14 are moveable relative the sidewalls 16, which may be generally stationary. By some approaches, the flaps 14 may be pivotally supported by the gas turbine engine 12 at a fore end 30 of the nozzle assembly 10, for example, by rotating means such as hinges 24.

The flaps 14 and sidewalls 16 define the nozzle core 22 that bounds core air exiting the gas turbine engine 12. Core air from the gas turbine engine 12 flows through the nozzle core 22 to create thrust for the gas turbine engine 12. Core air may flow through the nozzle core 22 from the fore end 30 to an aft end 32 of the nozzle assembly 10. The aft end 32 of the nozzle assembly 10 defines an outlet 26, which is generally rectangular, for discharging core air from the nozzle assembly 10 to the ambient environment. In some approaches, the flaps 14 are moveable to direct the flow and pressure of core air within the nozzle core 22. For example, the flaps 14 may be vertically moveable to adjust the size of the outlet 26 of the nozzle assembly 10.

Figure 2:
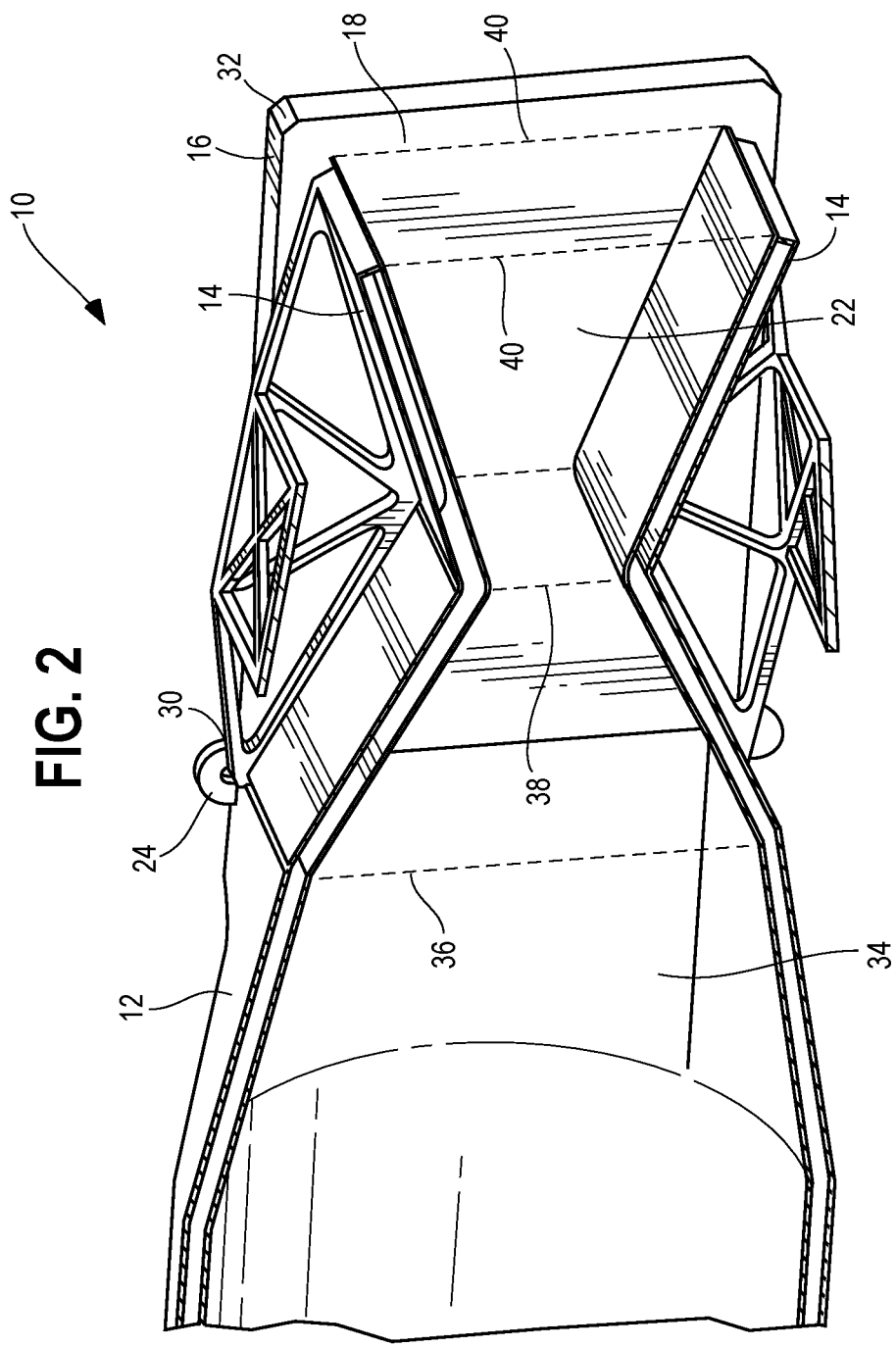
FIG. 2 is a cross-sectional view of the nozzle assembly of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. As shown in FIG. 2, in some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core 22 includes a first cross-sectional area 36, a second cross-sectional area 38, and a third cross-sectional area 40. The flaps 14 control the size of the second cross-sectional area 38 and the third cross-sectional area 40.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 40.

Figure 3:
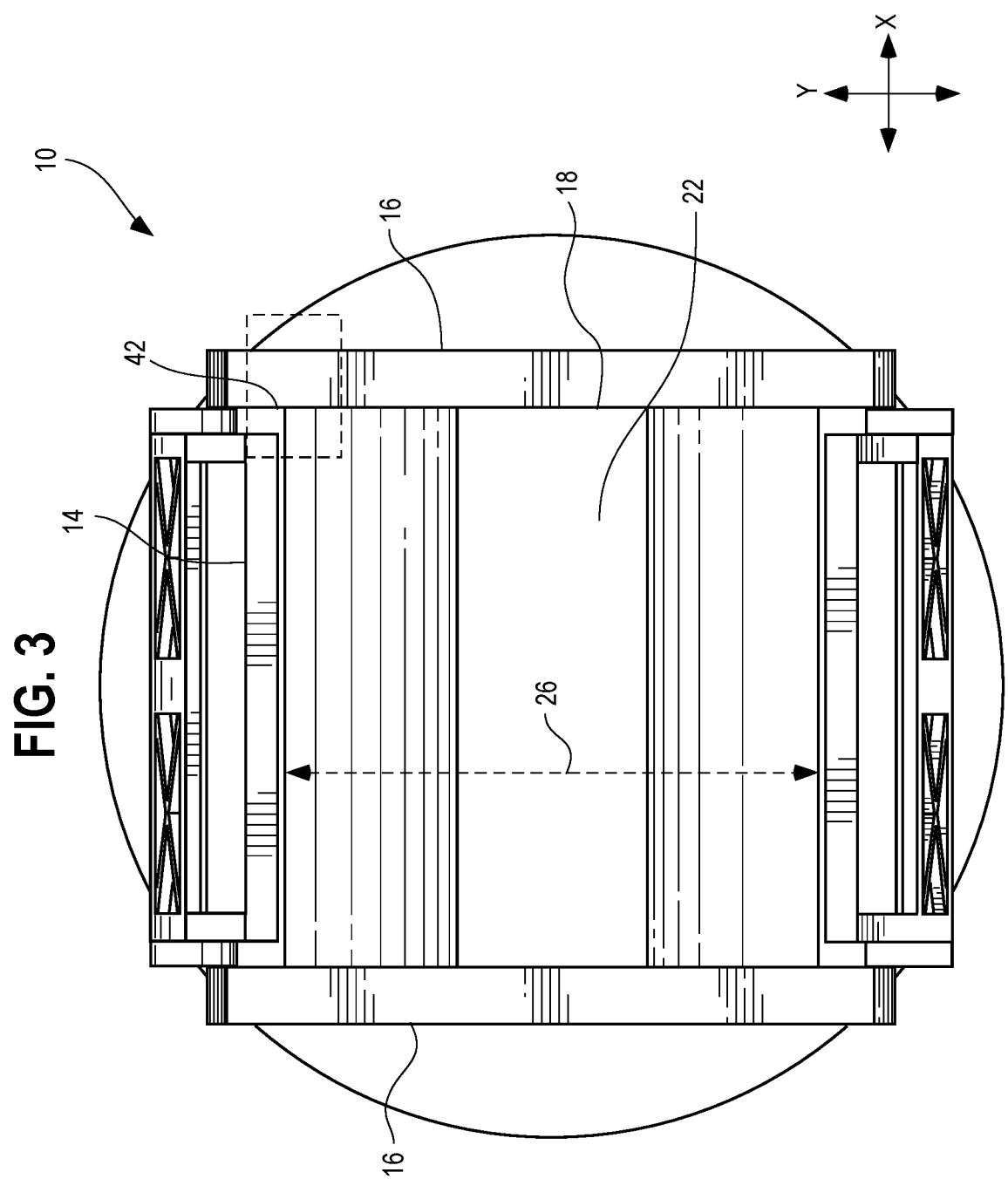
FIG. 3 is an end, elevation view of the nozzle assembly of FIG. 1 taken from an aft end of the nozzle assembly.

Turning to FIG. 3, a gap 42 between the flap 14 and the sidewall 16 extends along the length of the flap 14 (i.e., from the fore end 30 to the aft end 32 of the nozzle assembly 10 as shown in FIG. 1). The gap 42 may be continuous or interrupted at one or more locations. The size of the gap 42 may vary dynamically during operation of the nozzle assembly 10. During operation, the flaps 14 move along the Y-direction shown in FIG. 3. This motion of the flaps 14, for example, varies the size of the outlet 26 of the nozzle assembly 10. Additionally, during operation, the sidewall 16 may shift along the X-direction shown in FIG. 3. For example, the pressure of core air in the nozzle core 22 may force the sidewall 16 away from the flap 14, increasing the size of the gap 42. Accordingly, the gap 42 may be narrower when the nozzle core 22 is at atmospheric pressure than when the nozzle core 22 receives engine core air during operation of the nozzle assembly 10. In addition to motion of the sidewall 16, the liner 18 of the sidewall 16 may also distort during operation, causing the liner 18 to shift along one or more of the X-direction and Y-direction. Such liner distortion may occur, for example, due to changes in temperature and pressure along the nozzle core 22. A seal assembly 50 (not shown in FIG. 3) is installed in the gap 42 between the flap 14 and the sidewall 16.

Figure 4:
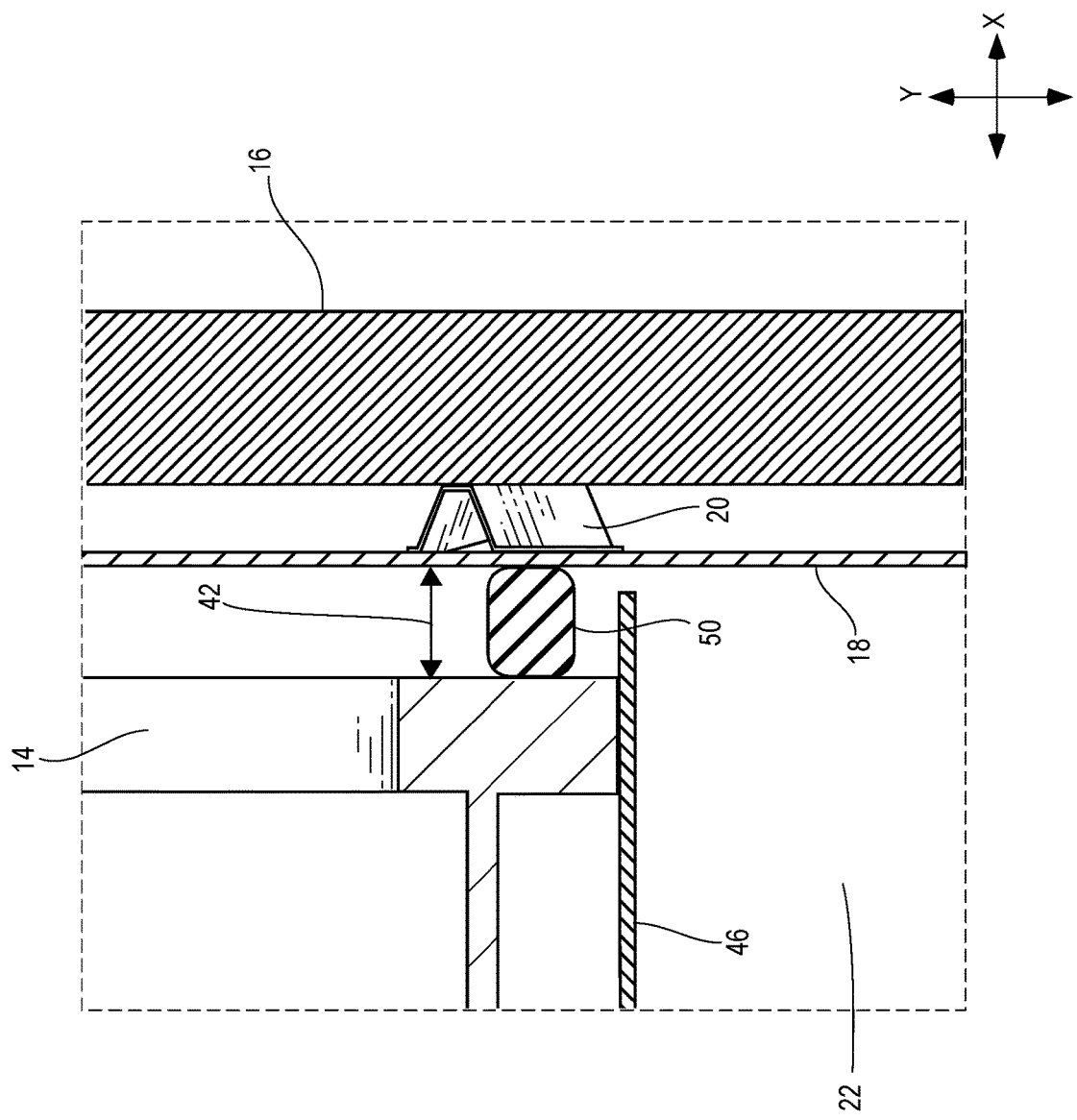
FIG. 4 is an enlarged, cross-sectional view, taken along line 4-4 in FIG. 1 of a portion of the nozzle assembly of FIG. 1.

With reference to FIG. 4, the gap 42 extends generally between the flap 14 and the sidewall 16. In the nozzle assembly 10, the sidewall 16 includes a liner 18, which is mounted to the sidewall 16 via hangers 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42.

The nozzle assembly 10 includes the seal assembly 50 positioned in the gap 42. The seal assembly 50 bridges the gap 42 between the flap 14 and the sidewall 16 to seal the gap 42. In this manner, the seal assembly 50 reduces the flow of core air from the nozzle core 22 through the gap 42 which may decrease or effect the flow of core air from the nozzle core 22 to the ambient environment surrounding the nozzle assembly 10.

Figure 5:
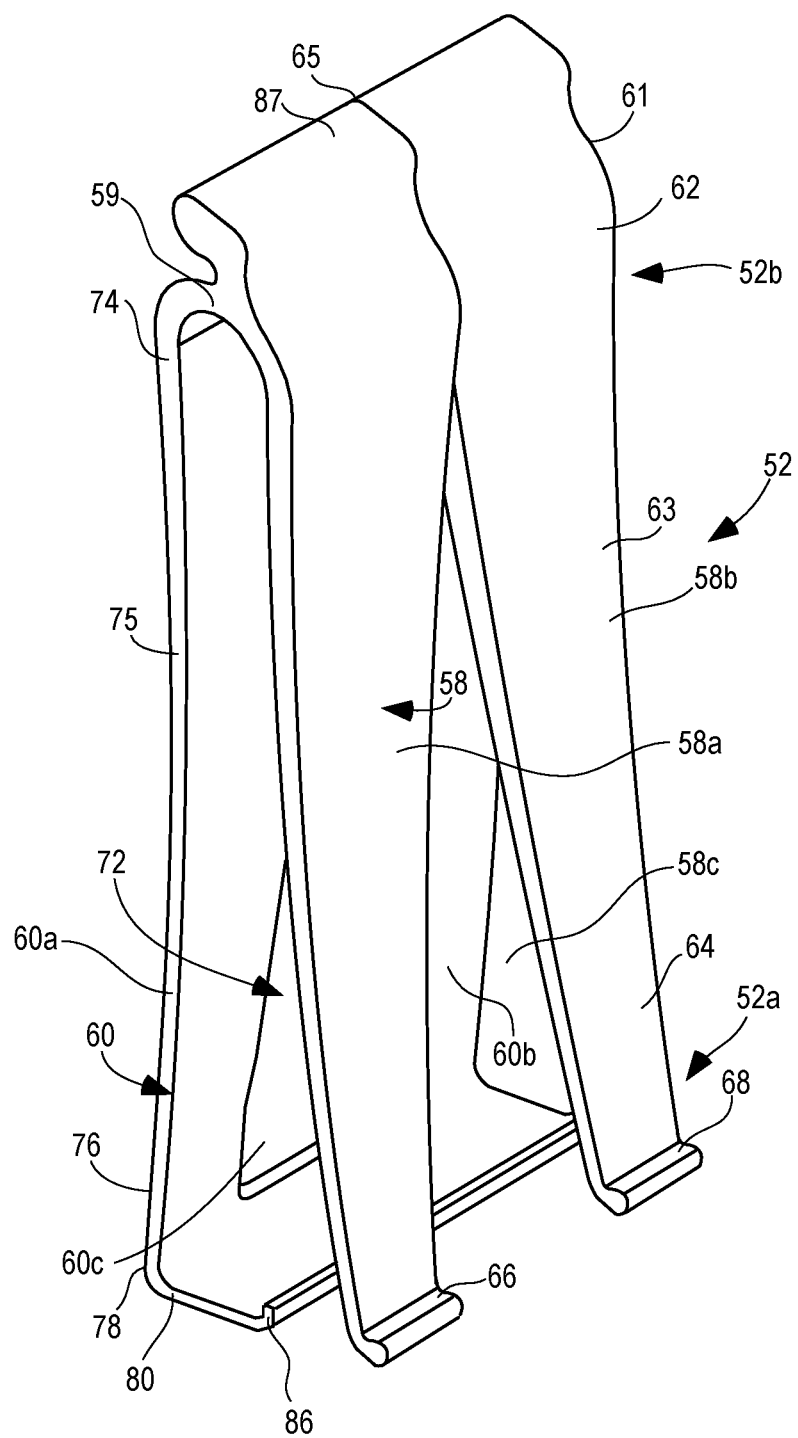
FIG. 5 is a perspective view of a spring body for a seal assembly, in accordance with some embodiments.

FIG. 5 illustrates the spring body 52 for the seal assembly 50. The seal assembly 50 may be a hinged seal assembly in which one or more components are coupled or linked together with a hinge feature. The spring body 52 includes a wall arm 58 and a flap arm 60 opposite the wall arm 58. Together, the wall arm 58 and the flap arm 60 define an interior space 72 of the spring body 52. The interior space 72 is bounded, at least in part, by the wall arm 58 and the flap arm 60. The spring body 52 is resilient such that the wall arm 58 and the flap arm 60 bias away from one another. Thus, when pre-loaded in the gap 42 (see FIGS. 10 and 11), the spring body 52 exerts an outward resilient force. In FIG. 5, the spring body 52 is depicted in a free state, that is, without any compression or external force being applied to the spring body 52.

The wall arm 58 includes a proximal end portion 62, a distal end portion 64, and an intermediate portion 63 extending between the proximal end portion 62 and the distal end portion 64. The thicknesses of the wall arm 58 may be about the same along the intermediate portion 63 (i.e., from the proximal end portion 62 to the distal end portion 64). It is also contemplated that the thicknesses of the intermediate portion 63 may be tapered or otherwise adjusted to manage loading and stress on the wall arm 58. For example, a thicker wall arm 58 may increase the spring loading. In some approaches, the intermediate portion 63 tapers from thicker at the proximal end portion 62 to thinner at the distal end portion 64. The distal end portion 64 of the wall arm 58 includes the first knuckle 66 and the second knuckle 68. The first knuckle 66 and the second knuckle 68 are rounded protuberances that extend from the wall arm 58 in a direction opposite the interior space 72. The first knuckle 66 is spaced from the second knuckle 68 and, in some aspects, there is a gap between the first knuckle 66 and the second knuckle 68. The first knuckle 66 and the second knuckle 68 are positioned on opposite sides of the wall arm 58.

In some embodiments, the wall arm 58 is bifurcated and includes a first branch 58a and a second branch 58b with a cut-out 58c therebetween. In such an embodiment, the first branch 58a includes the first knuckle 66 and the second branch 58b includes the second knuckle 68. Bifurcation of the wall arm 58 in this manner reduces stress on the wall arm 58 and increases compliance across the wear shoe 56 to a liner 18 and/or a sidewall 16 that is deformed.

The flap arm 60 includes a proximal end portion 74, a distal end portion 76, and an intermediate portion 75 extending between the proximal end portion 74 and the distal end portion 76. The thicknesses of the flap arm 60 may be about the same along the intermediate portion 75 (i.e., from the proximal end portion 74 to the distal end portion 76). It is also contemplated that the thicknesses of the intermediate portion 75 may be tapered or otherwise adjusted to manage loading and stress on the flap arm 60. For example, a thicker flap arm 60 may increase the loading of the spring body 52. In some approaches, the intermediate portion 75 tapers from thicker at the proximal end portion 74 to thinner at the distal end portion 76. The distal end portion 76 of the flap arm 60 includes an elbow 78 and the skirt 80. The skirt 80 extends away from the elbow 78 and into the interior space 72. The skirt 80 includes a lip 86 that projects outward from the skirt into the interior space 72.

In some embodiments, the flap arm 60 is bifurcated and includes a third branch 60a and a fourth branch 60b with a cut-out 60c therebetween. A distal end portion of the third branch 60a is coupled to a distal end portion of the fourth branch 60b via the elbow 78. The bifurcation of the flap arm 60 in this manner reduces stress on the flap arm 60 and also improves the compliance of the seal assembly 50. A proximal end portion of the third branch 60a is coupled to a proximal end portion of the first branch 58a via a first u-shaped portion 59. Similarly, a proximal end portion of the fourth branch 60b is coupled to a proximal end portion of the second branch 58b via a second u-shaped portion 61. The second u-shaped portion 61 is spaced from the first u-shaped portion by an aperture 65.

The proximal end portion 62 of the wall arm 58 and the proximal end portion 74 of the flap arm 60 are coupled together at a proximal end portion 52b of the spring body 52. The proximal end portion 52b of the spring body 52 includes an attachment member 87 for mounting the spring body 52 to the flap 14. The attachment member 87 may be any suitable structure that allows for hinged mounting of the spring body 52 to the flap 14.

The spring body 52 may be made of any suitable metallic material(s). The spring body 52 is made of a material capable of withstanding temperatures in the range of the application and, in some aspects, is made of a material capable of withstanding temperatures in the range of about 350° F. to about 2800° F. In some embodiments, the spring body 52 is made of a tolerant, spring material such as Inconel 718. The spring body 52 may be manufactured via any suitable manufacturing method. In some approaches, the spring body 52 is manufactured via an additive manufacturing method such as wire electrical discharge machining (EDM).

Figure 6:
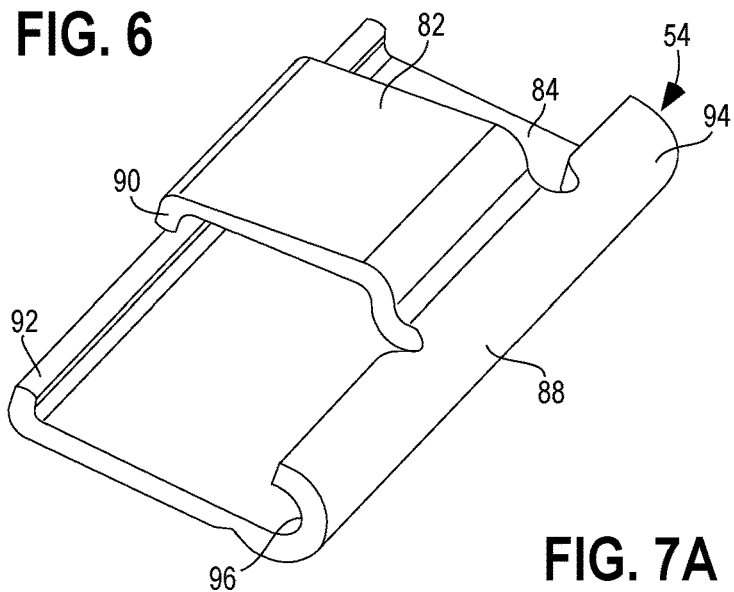
FIG. 6 is a perspective view of clip for a seal assembly, in accordance with some embodiments.

FIG. 6 illustrates the clip 54 of the seal assembly 50. The clip 54 includes an upper jaw 82 and a lower jaw 84. The upper jaw 82 is spaced from and opposite the lower jaw 84. The upper jaw 82 and the lower jaw 84 form an opening therebetween. The upper jaw 82 includes a downward extending projection 90 extending transverse to the upper jaw 82 towards the lower jaw 84. In some aspects, the downward extending projection 90 is positioned at a tip of the upper jaw 82. The lower jaw 84 includes an upward extending projection 92 that extends transverse the lower jaw 84 toward the upper jaw 82. In some aspects, the upward extending projection 92 is positioned at a tip of the lower jaw 84. The upper jaw 82 is coupled to the lower jaw 84 via a c-shaped portion 88. The c-shaped portion 88 includes a curved outer surface 94 and a curved inner surface 96. The curved inner surface 96 is configured to receive the first knuckle 66 and the second knuckle 68 of the spring body 52 (shown in FIG. 5). The curved outer surface 94 of the clip 54 has a geometry corresponding to a geometry of a recess 98 of the wear shoe 56 (shown in FIGS. 7A and 7B).

The clip 54 may be made of any suitable metallic or ceramic materials or combinations thereof. The clip 54 is made of a material capable of withstanding temperatures for the application and, in some aspects, is made of a material capable of withstanding temperatures in the range of about 350° F. to about 2800° F. In some embodiments, the clip 54 is made of a high-speed steel (HS) material. In some approaches, the clip 54 is manufactured via an additive manufacturing method such as wire EDM.

Figure 7A:
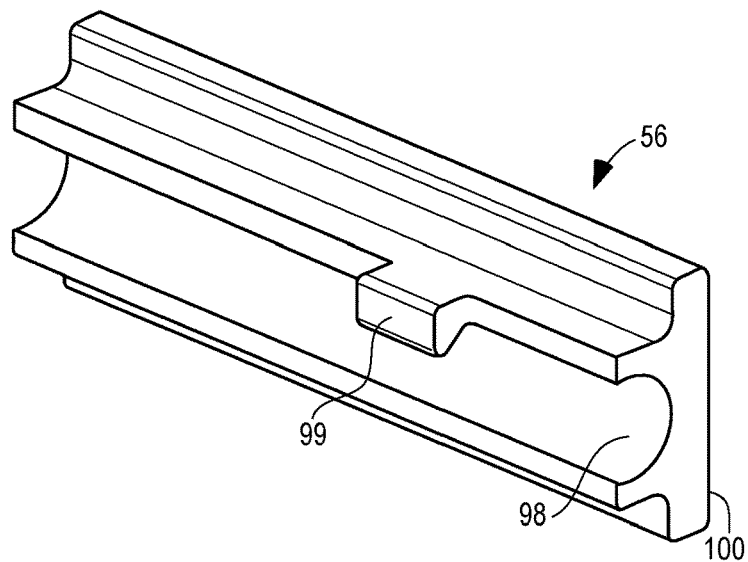
FIG. 7A is a rear, perspective view of a wear shoe for a seal assembly, in accordance with some embodiments.
Figure 7B:
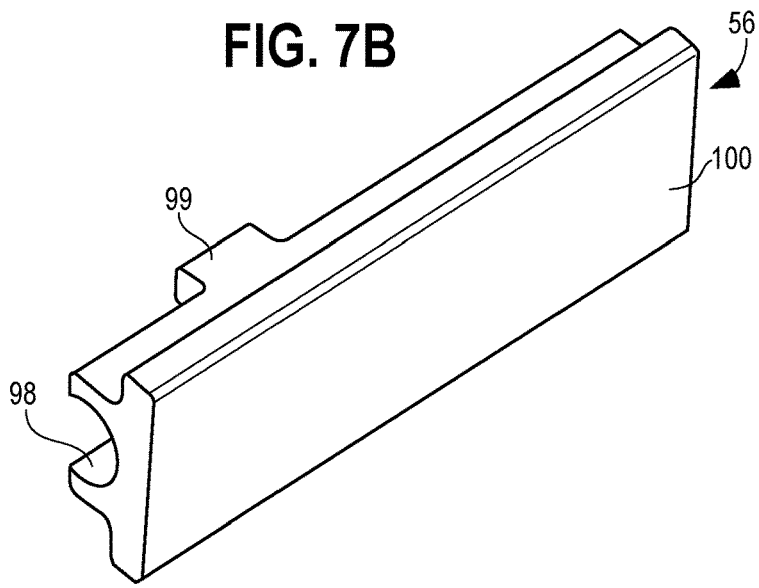
FIG. 7B is a front, perspective view of the wear shoe of FIG. 7A.
Figure 10:
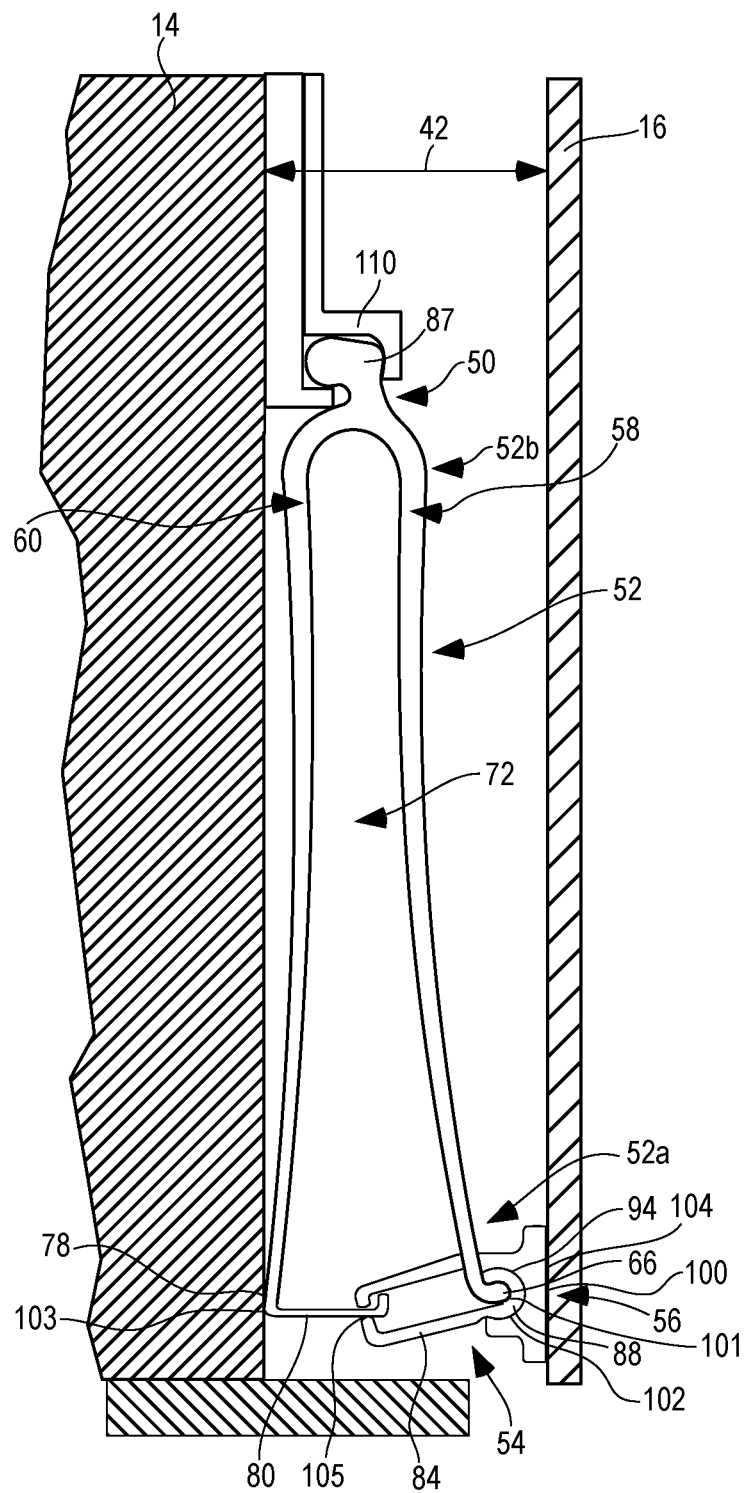
FIG. 10 is a left, side elevation view of the seal assembly of FIG. 8 installed in a gap.
Figure 11:
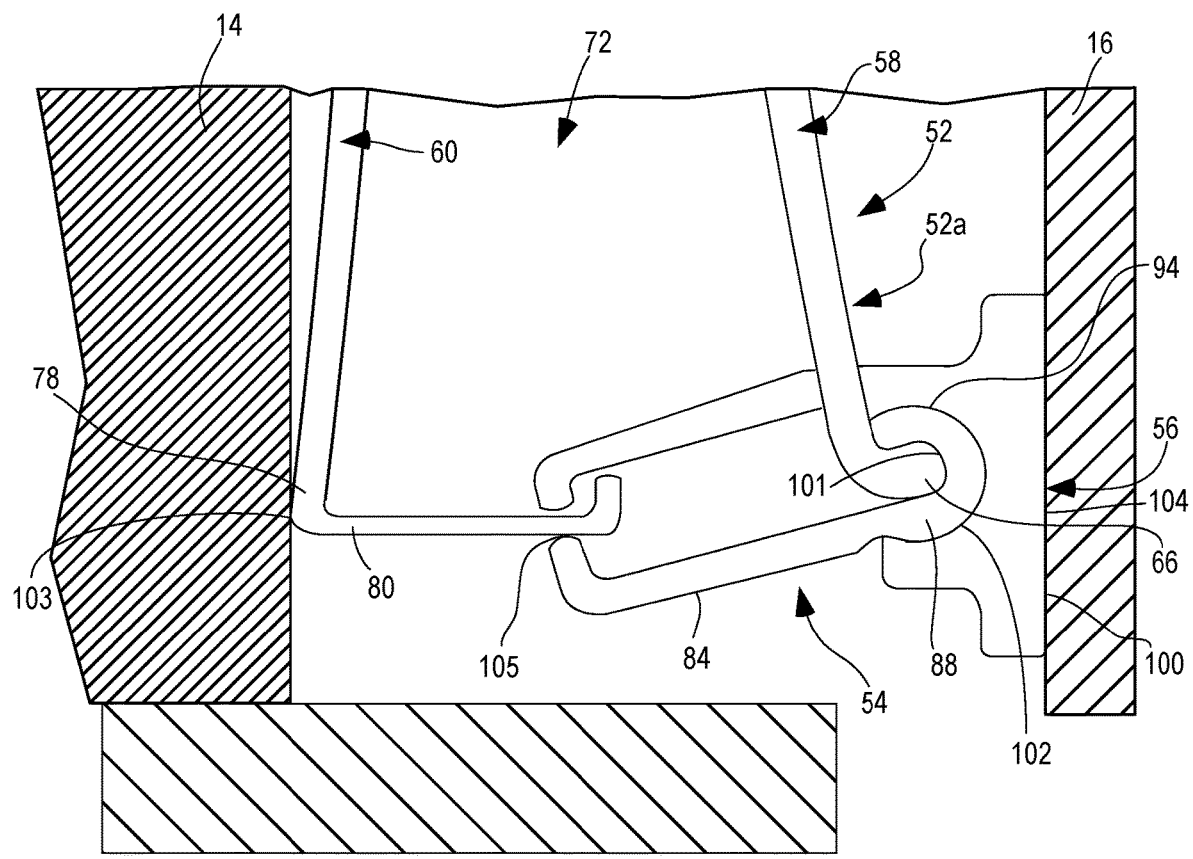
FIG. 11 is an enlarged, elevation view of the seal assembly of FIG. 10.

FIGS. 7A and 7B illustrate the wear shoe 56 of the seal assembly 50. The wear shoe 56 includes a recess 98 having a geometry corresponding to a geometry of the curved outer surface 94 of the clip 54 (shown in FIG. 6). In some embodiments, the recess 98 is shaped so that it corresponds to the geometry of the c-shaped portion 88 of the clip 54 (shown in FIG. 6). The wear shoe 56 also includes a planar face 100. It is contemplated that the planar face 100 of the wear shoe 56 increases the sealing surface area of the seal assembly 50 (e.g., when the wear shoe 56 is positioned in the gap 42 as shown in FIGS. 10 and 11). It is also contemplated that including the planar face 100 may reduce contact stresses in the wear shoe 56 by providing a planar sealing surface, improving service longevity as compared to line contact sealing. The wear shoe 56 also includes a tab 99 that extends from the c-shaped portion 88 and towards the interior space 72 (not shown). The tab 99 acts to lock or otherwise retain the wear shoe 56 in place when the seal assembly 50 is in an assembled configuration.

The wear shoe 56 may be made of any suitable metallic or ceramic materials or combinations thereof. The wear shoe 56 is made of a material capable of withstanding temperatures in the range for the application and, in some aspects, is made of a material capable of withstanding temperatures in the range of about 350° F. to about 2800° F. In some embodiments, the wear shoe 56 is made of a sacrificial or abradable material such as Nitronic 60. In some approaches, the wear shoe 56 is manufactured via an additive manufacturing method such as wire EDM.

FIG. 8 and FIGS. 9A and 9B illustrate a seal assembly 50 in an assembled configuration. The seal assembly 50 includes the spring body 52, the clip 54, and the wear shoe 56. The clip 54 is coupled to the distal end portion 52a of the spring body 52. The wear shoe 56 is coupled to the clip 54.

When the seal assembly 50 is assembled, the clip 54 and the wear shoe 56 are coupled to the distal end portion 52a of the spring body 52. The clip 54 is coupled to both the wall arm 58 and the flap arm 60 of the spring body 52. In particular, the clip 54 is coupled to the first knuckle 66 and the second knuckle 68 of the spring body 52 to create a pivot joint or hinge feature. The first knuckle 66 and the second knuckle 68 (not shown) are received by the c-shaped portion 88 of the clip 54. The c-shaped portion 88 of the clip 54, the first knuckle 66 and the second knuckle 68 create the pivot joint or hinge feature. The hinge feature allows the clip 54 to pivot about the first knuckle 66 and the second knuckle 68. The skirt 80 is received by the upper jaw 82 and the lower jaw 84 of the clip 54. When the skirt 80 is inserted into the clip 54, the skirt 80 is positioned in the opening between the upper jaw 82 and the lower jaw 84 of the clip 54. The downward extending projection 90 of the upper jaw 82 engages the lip 86 of the skirt 80. The wear shoe 56 is coupled to the curved outer surface 94 of the clip 54 to create another pivot joint or hinge feature. The hinge feature allows the wear shoe 56 to pivot about the clip 54. These pivot joints or hinge features facilitate pivoting motion of the seal assembly 50 and allow for compliance of the seal assembly 50 in additional degrees of freedom. An exemplary method of assembling the seal assembly 50 is depicted in FIG. 14.

In operation, the proximal end portion 52b of the spring body 52 is coupled to the flap 14 shown in FIGS. 1-4 via the attachment member 87. The proximal end portion 52b of the spring body 52 is pivotably mounted to the flap 14 via the attachment member 87 so that the distal end portion 52a of the spring body 52 is free to flex and/or move angularly. When the spring body 52 is in a free, uncompressed state, the wall arm 58 and the flap arm 60 are biased away from one another. When the spring body 52 in a compressed state, the spring body 52 generates a force that urges the wall arm 58 away from the flap arm 60. This force causes the clip 54 to slide along the skirt 80. In this manner, the spring body 52 drives the clip 54 and the wear shoe 56 away from the flap arm 60.

In some embodiments, the seal assembly 50 or portions thereof may be made as a flexure component, that is a flexible element engineered to be compliant in specific degrees of freedom. For example, the wall arm 58 and the flap arm 60 may be flexure components that cause the spring body 52, the clip 54, and the wear shoe 56 to move in a predictable manner by restricting, relating, and defining the degrees of freedom of their motion through the shape of the components. That is, the components of the seal assembly 50 move and are related to each other through the bending and torsional strains inside each respective component. In this way, these components are flexurally related, and flexural joints constrain movement of the components.

Further, in this manner, the seal assembly 50 may undergo deformation and/or motion in specific degrees of freedom when an external force is applied to the seal assembly 50. As discussed above, the wall arm 58 and the flap arm 60 may be flexures that relate and restrict motion of the seal assembly 50 to specific degrees of freedom. In this manner, an external force applied to the seal assembly 50 is translated to predictable displacement or motion in the skirt 80, the clip 54, and the wear shoe 56. Further the wall arm 58 and the flap arm 60 restrict, relate, and define the degrees of freedom for the motion of the skirt 80, the clip 54, and the wear shoe 56 for the seal assembly 50.

FIGS. 10 and 11 depict the seal assembly 50 installed in the gap 42 between the flap 14 and sidewall 16 (also shown in FIG. 4). The seal assembly 50 is installed in an assembled configuration and, thus, includes the spring body 52, the clip 54, and the wear shoe 56. It should be understood that, when referring to the sidewall 16 herein, the sidewall 16 may include either the sidewall 16 and/or the sidewall 16 and the liner 18. When installed in the gap 42, the wall arm 58 of the spring body 52 is positioned adjacent the sidewall 16 while the flap arm 60 of the spring body 52 is positioned adjacent the flap 14.

The proximal end portion 52b of the spring body 52 is coupled to the flap 14 while the distal end portion 52a is free to move relative to the flap 14. In particular, the attachment member 87 on the proximal end portion 52b is coupled to the flap 14 via a top mount 110. A portion of the top mount 110 projects away from the flap 14 into the gap 42. In some embodiments, a portion of the top mount 110 is positioned at an angle of about 90 degrees relative to the flap 14. As discussed above, the attachment member 87 hingedly or rotatably couples the seal assembly 50 to the top mount 110. In this manner, the attachment member 87 allows the seal assembly 50 to pivot or rotate. Thus, the distal end portion 52a of the seal assembly 50 may move towards or away from the sidewall 16 and/or the flap 14, for example, to accommodate variations in the size of the gap 42.

The seal assembly 50 seals the gap 42 at various surfaces of contact creating multiple sealing interfaces. The sealing interfaces prevent or reduce the flow of core air around the seal assembly 50 to the ambient environment. The wall arm 58 engages the clip 54 at a first surface of contact 101. In particular, the first knuckle 66 and the second knuckle 68 engage the c-shaped portion 88 of the clip 54 at the first surface of contact 101. At the first surface of contact 101, one or more portions of the wall arm 58 may contact the clip 54, however, the first surface of contact 101 may not necessarily create a sealing interface that prevents or reduces the flow of core air around the seal assembly 50.

The clip 54 engages the wear shoe 56 at a second surface of contact 102, which is one of the multiple sealing interfaces of the installed seal assembly 50. In particular the curved outer surface 94 of the clip 54 engages the wear shoe 56 at the second surface of contact 102. The second surface of contact 102 seals a space between the wall arm 58 and the sidewall 16. Further, the second surface of contact 102 is a pivot joint or hinge feature that allows the wear shoe 56 to pivot about the clip 54. Because the wear shoe 56 is able to pivot, it is able react to distortions in the sidewall 16.

The flap arm 60 engages the flap 14 at a third surface of contact 103, which is one of the multiple sealing interfaces of the installed seal assembly 50. In particular, the elbow 78 engages the flap 14 at the third surface of contact 103. The third surface of contact 103 seals a space between the flap arm 60 and the flap 14.

The wear shoe 56 engages the sidewall 16 at a fourth surface of contact 104, which is one of the multiple sealing interfaces of the installed seal assembly 50. In particular, the planar face 100 of the wear shoe 56 engages the sidewall 16 at the fourth surface of contact 104. In this manner, the fourth surface of contact 104 seals a space between the wear shoe 56 and the sidewall 16. The planar nature of the planar face 100 creates a planar seal, as opposed to a line seal, at the fourth surface of contact 104.

The flap arm 60 engages the clip 54 at the fifth surface of contact 105, which is one of the multiple sealing interfaces of the installed seal assembly 50. The lower jaw 84 of the clip 54 slidingly engages the skirt 80 of the flap arm 60 at the fifth surface of contact 105 such that the lower jaw 84 is able to move inward and outward along the skirt 80 while maintaining a seal. In this manner, the fifth surface of contact 105 seals the interior space 72.

It will be understood that while there are multiple surfaces of contact only a subset of those create sealing interfaces for the hinged seal. In the illustrated example, the multiple sealing interfaces include four sealing interfaces although the number could be different in an alternate configuration.

When installed within the gap 42, the seal assembly 50 is under compression. As discussed above, the seal assembly 50 is resilient such that the seal assembly 50 has memory. Due to its resiliency, the seal assembly 50 is able to spring back to its free state after being compressed. Thus, when under compression, the seal assembly 50 exerts an outward resilient force or spring force that urges the seal assembly 50 to return to its free state. The outward resilient force biases the flap arm 60 away from the wall arm 58. In the gap 42, the outward resilient force urges the flap arm 60 towards the flap 14 and urges the wall arm 58 towards the sidewall 16 to seal the gap 42. When under compression, the spring body 52 generates outward resilient force that is balanced between the third surface of contact 103 and the fourth surface of contact 104. It is contemplated that, by loading the spring body 52 in the gap 42, the seal assembly 50 is then not dependent on external hardware or loading to operate.

In operation, one or more external forces may be applied to the seal assembly 50. The flap 14 may move during operation causing external forces to be exerted on the seal assembly 50. In addition, the sidewall 16 may move or deflect exerting an external force on the wear shoe 56. As discussed above, due to the hinged construction of the seal assembly 50, the wear shoe 56 is able to pivot about the clip 54 to react to external forces applied to the wear shoe 56. The hinged construction also allows the clip 54 to pivot about the first knuckle 66 and the second knuckle 68 (not shown) in reaction to an external force. The wear shoe 56 then exerts a force on the wall arm 58 (e.g., the first knuckle 66 and the second knuckle 68). The external force on the wear shoe 56 also urges the clip 54 inwardly along the skirt 80 of the flap arm 60. The spring body 52 relates the movement of the wall arm 58 and the flap arm 60 so that loading the distal end portion 64 of the wall arm 58 causes both the flap arm 60 and the wall arm 58 to move about the attachment member 87.

Figure 12:
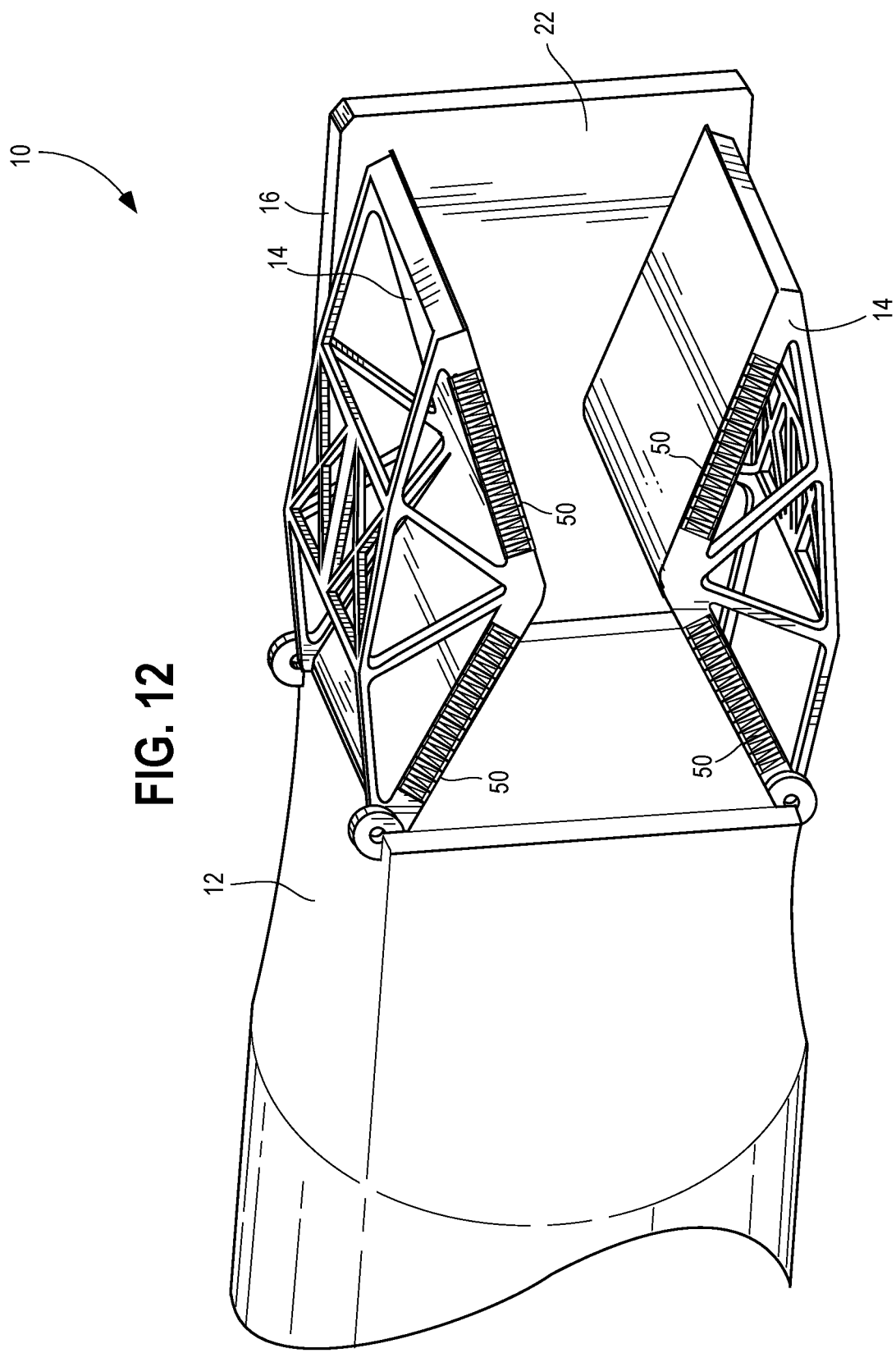
FIG. 12 is a perspective view of a series of the seal assemblies of FIG. 8, installed in the nozzle assembly of FIG. 1.

FIG. 12 illustrates an exemplary installation of a series of hinged seals 50 in the nozzle assembly 10 depicted in FIG. 1. The hinged seals 50 are installed linearly along the edge of the flap 14.

Figure 13:
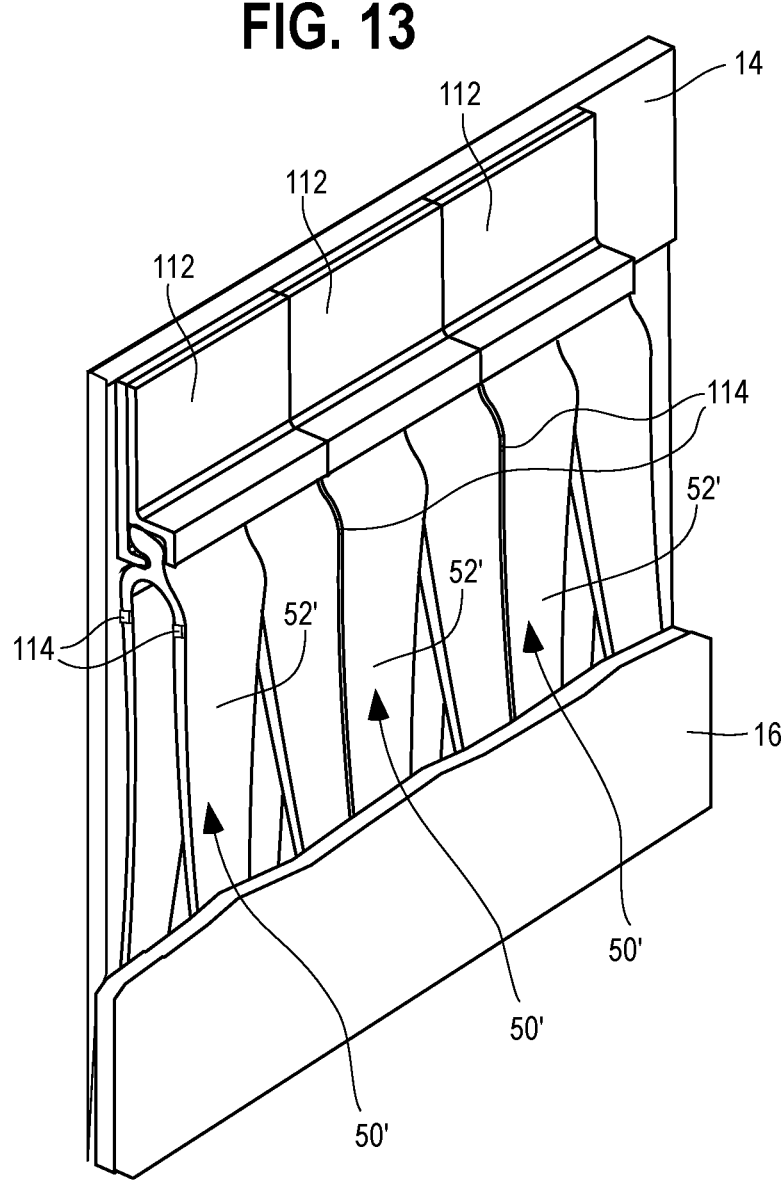
FIG. 13 is another perspective view of a series of the seal assemblies installed in a gap.

FIG. 13 illustrates another exemplary installation of a series of hinged seals 50' installed in housings 112. The housings 112 are coupled to the flap 14 (not shown in FIG. 13). The housings 112 are configured to act as a top mount for the hinged seals 50'. In the embodiment depicted in FIG. 13, each seal assembly 50' has its own housing 112 for mounting the seal assembly 50' to the flap 14. However, it is also contemplated that multiple hinged seals 50' may be coupled to a single housing 112. The housing 112 is optional and, in some approaches, the series of hinged seals 50' may be directly mounted to the flap 14 without the use of the housing 112. The edges of the springs 52' in the hinged seals 50' may include one or more projections 114. The projections 114 space the hinged seals 50' away from each other by a predetermined distance. Spacing the hinged seals 50' by a predetermined distance may reduce the risk of binding between the hinged seals 50' that are positioned adjacent to each other.

It is contemplated that stacking the hinged seals 50 and the hinged seals 50' in series in the manner shown in FIGS. 12 and 13 allows for conformance against a deflected sidewall 16 and/or liner 18. That is, including multiple hinged seals 50 or multiple hinged seals 50' in series, rather than including one or multiple longer seals, allows for conformability of the seals to the sidewall 16 and/or liner 18 without resulting in sealing line discontinuities.

FIG. 14 is a flow chart diagram of an exemplary method 120 of assembling the seal assembly 50. The method 120 includes coupling 122 the clip 54 to the skirt 80 of the flap arm 60. For example, the upper jaw 82 and lower jaw 84 of the clip 54 may be coupled to the skirt 80. In some approaches, such coupling 122 involves sliding the upper jaw 82 and the lower jaw 84 of the clip 54 onto the skirt 80 of the flap arm 60. The method 120 also includes compressing 124 the distal end portion 64 of the wall arm 58 towards the skirt 80 of the flap arm 60. In one example, the step of compressing 124 may involve compressing the first knuckle 66 and the second knuckle 68 of the wall arm 58 towards the skirt 80. As illustrated in FIG. 5, when the spring body 52 is in a free state, the wall arm 58 biases away from the flap arm 60. Accordingly, to couple the wall arm 58 to the flap arm 60 using the clip 54, the wall arm 58 or portions thereof (i.e., the distal end portion 64 or the first knuckle 66 and/or the second knuckle 68) are compressed such that they may be inserted into the clip 54. Thus, when the seal assembly 50 is assembled and the clip 54 is coupled to the wall arm 58 and the flap arm 60, the spring body 52 is in a partially compressed state.

The method 120 includes rotating, at 126, the clip 54 such that at least one portion of the distal end portion 64 of the wall arm 58 aligns with the clip 54. In some approaches, step 126 involves rotating the clip 54 such that the first knuckle 66 and the second knuckle 68 align with the curved inner surface 96 of the clip 54 and then releasing the first knuckle 66 and the second knuckle 68 to engage the curved inner surface 96 of the clip 54. As discussed above, when the first knuckle 66 and the second knuckle 68 are positioned in the c-shaped portion 88 of the clip 54, the spring body 52 is in a partially compressed state. At this stage in the assembly process, the first knuckle 66 and the second knuckle 68 may engage the curved inner surface 96 of the clip 54 and the lip 86 of the skirt 80 engages the downward extending projection 90 of the clip 54. It is contemplated that other portions of the spring body 52 may engage the clip 54 and that the distal end portion 64 of the wall arm 58 may engage the clip 54 in any suitable manner.

The method 120 may also include compressing and/or holding 128 a portion of the spring body 52 towards the skirt 80 and mounting the wear shoe 56 onto the clip 54. At 128, the method 120 may include compressing the distal end portion 64 of the wall arm 58. The wear shoe 56 may then slide onto the clip 54. Such compression of the spring body 52 may prevent a portion of the wear shoe 56 from catching on the spring body 52 when the wear shoe 56 is being slid into place. In some approaches, the method includes compressing and/or holding 128 at least one of the first knuckle 66 and the second knuckle 68 towards the skirt 80 and mounting the wear shoe 56 onto the clip 54 until the wear shoe 56 is engaged and flush with the clip 54. Mounting the wear shoe 56 onto the clip 54 may involve sliding the wear shoe 56 onto the curved outer surface 94 of the clip 54. The wear shoe 56 may be positioned onto the clip 54 such that the edges of the wear shoe 56 are flush with the edges of the clip 54. Assembling the seal assembly 50 such that the edges of the wear shoe 56 are flush with the edges of the clip 54 may reduce the risk of binding between hinged seals 50 that are installed adjacent to each other in series.

Finally, the method 120 includes releasing 129 the spring body 52 to engage the clip 54. When the distal end portion 64 of the wall arm 58 is compressed at step 128, the distal end portion 64 may be released at 129 to engage the clip 54. Upon releasing 129 the spring body 52, a portion of the spring body 52, such as the first knuckle 66 and/or the second knuckle 68, may engage one or more portions of the clip 54. In some approaches, the method 120 includes releasing 129 the first knuckle 66 and/or the second knuckle 68 to engage into the curved inner surface 96 of the clip 54. When assembled, the spring body 52 engages the upper jaw 82 of the clip 54 and the tab 99 of the wear shoe 56. In particular, the upper jaw 82 and the tab 99 are retained between the first knuckle 66 and the second knuckle 68 of the spring body 52 to lock or otherwise retain the components of the seal assembly 50 together. While FIG. 14 depicts one method of assembling the seal assembly 50, it is also contemplated that other suitable methods may be used.

FIG. 15 is a flow chart of an exemplary method 130 of sealing a gap. The method 130 includes positioning 132 a seal assembly within the gap. The seal assembly includes a spring having a first arm opposite a second arm and defining an interior space therebetween. The second arm biases away from the first arm. A distal end portion of the second arm includes a skirt. The seal assembly also includes a clip pivotally coupled to a distal end portion of the first arm. The seal assembly further includes a wear shoe pivotally coupled to the clip. In some approaches, the seal assembly is the seal assembly 50 depicted in FIGS. 5-11. The method 130, at 134, also includes sealing the gap and sealing an interior of the seal assembly using one or more portions of the seal assembly. The gap may be sealed by contacting the second arm against a first surface defining the gap and contacting the wear shoe against a second surface defining the gap. Further, an interior of the seal assembly may be sealed by contacting at least a portion of the wear shoe with the clip and by contacting at least a portion of the clip with the skirt. The method 130 further includes automatically pivoting 136 the wear shoe about the clip in response to a movement in the second surface. In response to a movement in the second surface, the method 130 may also further include automatically pivoting 138 the clip about the distal end portion of the first arm. The method 130 may also include automatically moving 140 the clip along the skirt to seal an interior space between the first arm and the second arm.

In some embodiments, the method 130 may be used to seal the gap 42 between the flap 14 and sidewall 16 as shown in FIG. 4. In such an embodiment, the flap 14 corresponds to the first surface defining the gap and the sidewall 16 corresponds to the second surface defining the gap. Thus, the movement in the second surface may be a movement caused due to distortion of the sidewall 16 and/or due to movement of the flap 14 along the sidewall 16.

It is contemplated that the seal assemblies described herein may be installed in any moveable and/or dynamic gap, for example, between any form of moveable flap and stationary structure.

It is also contemplated that the seal assemblies 50 and sealing methods described herein may be used to seal a gap between the sidewall 16 and the liner 18 or, when the liner 18 is not utilized, a gap between the sidewall 16 and the flap 14.

Conventional plunger seals or leaf seals may be dependent on external hardware for alignment or loading in order to operate. Aspects of the present disclosure allow for precise and consistent tolerances between components and at sealing interfaces without such external hardware or loading. Thus, seal hardware complexity is reduced and only a support interface is employed on the housing for the seal assembly. The housing described herein allows for a cantilevered installation of the seal assembly that removes external spring elements and their guide or retention components, which increases reliability while reducing weight and complexity. Such a cantilevered installation of the seal assembly also balances the spring load between the contact ends of the spring body that create the sealing interfaces at either side of the gap. The seal assembly hardware components are also self-contained and self-locking so do not require additional fastener hardware, further simplifying the seal assembly. Tight controlled gaps may be achieved at all sealing interfaces using the seal assemblies described herein to prevent core to ambient leakage. As compared to conventional plunger seals, the seal assemblies described herein may have a smaller housing depth and do not require differential pressure on the seal assembly to energize the sealing interfaces.

Further still, the hinged and multi-component design of the seal assemblies described in the present disclosure allows for flexibility in thermal growth, binding, and differential loading at operational conditions. The hinge features enable pivot motion and sealing contact between the clip and the spring body, between the clip and the wear shoe, and between the wear shoe and the liner. Further, the hinged and multi-component design reduces the likelihood of binding due to fluctuations in operational conditions (e.g., thermal growth, changes in operational pressure) and due to inter-component variability. Seal contact loads at the various sealing interfaces are tailorable by modifying the spring body, for example by adjusting the cross section of the spring body, and are not dependent on cycle conditions.

The seal assemblies described herein may be segmented and installed in series, as opposed to installed as a single continuous length seal, to meet thermal and differential pressure gradients. Such a segmentation may improve conformability without resulting in overall sealing discontinuities. Further, the seal assemblies described herein my eliminate or reduce rippling and/or non-sealing characteristics which may be present in continuous length seals. Segmenting and installing the seal assemblies in series (i.e., stacking the seal assemblies) improves conformance to deflected surfaces such as sidewall liners. Further, the wear shoes employed in the seal assemblies maintain conformance to a deflected liner with loading by the spring body. The wear shoes further increase the area of the sealing interface (i.e., the area in contact with the liner) and reduce contact stresses as compared to line sealing. Use of a sacrificial or abradable material in the wear shoe my further increase service longevity of the seal assemblies described herein.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Further aspects of the invention are provided by the subject matter of the following clauses:

A seal assembly, comprising: a spring body, comprising: a first arm having a first proximal end portion and a first distal end portion, and a second arm opposite the first arm and defining an interior space therebetween, the second arm having a second proximal end portion coupled to the first proximal end portion and a second distal end portion, the second distal end portion including an elbow and a skirt extending away from the elbow and into the interior space; wherein at least a portion of the spring body exerts a force to urge at least one of the first arm and the second arm away from the other to seal a gap between a moveable flap and a stationary structure; a clip pivotally coupled to the first distal end portion of the first arm, the clip having an upper jaw and a lower jaw, the upper jaw and the lower jaw extending into the interior space and defining an opening therebetween configured to receive the skirt; and a wear shoe pivotally coupled to the clip.

The seal assembly of any preceding clause, wherein the seal assembly creates at least four sealing interfaces, the at least four sealing interfaces including at least two sealing interfaces at each side of the gap and at least two sealing interfaces interior to the seal assembly.

The seal assembly of any preceding clause, wherein the wear shoe engages the stationary structure at a first sealing interface, the first sealing interface sealing a space between the wear shoe and the stationary structure.

The seal assembly of any preceding clause, wherein the clip engages the wear shoe at a second sealing interface, the second sealing interface sealing a space between the clip and the wear shoe.

The seal assembly of any preceding clause, wherein the second arm engages the moveable flap at a third sealing interface, the third sealing interface sealing a space between the second arm and the moveable flap.

The seal assembly of any preceding clause, wherein the elbow of the second arm engages the moveable flap at the third sealing interface.

The seal assembly of any preceding clause, wherein the lower jaw of the clip engages the skirt at a fourth sealing interface, the fourth sealing interface sealing the interior space.

The seal assembly of any preceding clause, wherein the lower jaw of the clip slidingly engages the skirt at the fourth sealing interface.

The seal assembly of any preceding clause, wherein the clip further includes a c-shaped portion that couples the upper jaw to the lower jaw.

The seal assembly of any preceding clause, wherein the first distal end portion of the first arm includes a first knuckle and a second knuckle, and wherein the c-shaped portion has a curved outer surface configured to be matingly received by the wear shoe and a curved inner surface configured to matingly receive the first knuckle and the second knuckle.

The seal assembly of any preceding clause, wherein the first arm comprises a first branch and a second branch, and wherein the first knuckle is disposed on the first branch and the second knuckle is disposed on the second branch.

The seal assembly of any preceding clause, wherein the second arm comprises a third branch and a fourth branch, wherein a proximal end portion of the third branch is coupled to a proximal end portion of the first branch via a first u-shaped portion, and wherein a proximal end portion of the fourth branch is coupled to a proximal end portion of the second branch via a second u-shaped portion.

The seal assembly of any preceding clause, wherein the wear shoe is made of an abradable material.

The seal assembly of any preceding clause, wherein the seal assembly is assembled by: coupling the upper jaw and the lower jaw of the clip to the skirt of the second arm; compressing the first distal end portion of the first arm towards the skirt of the second arm; rotating the clip such that at least one portion of the first distal end portion of the first arm aligns with the clip; mounting the wear shoe onto the clip; and releasing the first distal end portion of the first arm to engage the clip.

A gas turbine engine nozzle assembly, comprising: a stationary structure; a moveable flap adjacent the stationary structure; and a first seal assembly disposed between the stationary structure and the moveable flap to seal a gap between the stationary structure and the moveable flap, the first seal assembly comprising: a first spring body comprising: a first arm having a first proximal end portion and a first distal end portion, and a second arm opposite the first arm and defining a first interior space therebetween, the second arm having a second proximal end portion coupled to the first proximal end portion and a second distal end portion, the second distal end portion including a first elbow and a first skirt extending away from the first elbow and into the first interior space; wherein the first spring body exerts a force to urge the first distal end portion toward the stationary structure and to urge the second distal end portion towards the moveable flap the to seal the gap; a first clip pivotally coupled to the first distal end portion of the first arm, the first clip configured to receive the first skirt; and a first wear shoe pivotally coupled to the first clip.

The gas turbine engine nozzle assembly of any preceding clause, further comprising: a second seal assembly disposed between the stationary structure and the moveable flap, the second seal assembly comprising: a second spring body comprising: a third arm having a third proximal end portion and a third distal end portion, and a fourth arm opposite the third arm and defining a second interior space therebetween, the fourth arm having a fourth proximal end portion coupled to the third proximal end portion and a fourth distal end portion, the fourth distal end portion including a second elbow and a second skirt extending away from the second elbow and into the second interior space; a second clip pivotally coupled to the third distal end portion of the third arm, the second clip being configured to receive the second skirt; and a second wear shoe pivotally coupled to the second clip, wherein the second seal assembly is positioned a predetermined distance from the first seal assembly.

The gas turbine engine nozzle assembly of any preceding clause, wherein the first spring body includes at least one projection along a peripheral edge thereof, the at least one projection separating the first seal assembly from the second seal assembly by the predetermined distance.

The gas turbine engine nozzle assembly of any preceding clause, wherein the first seal assembly and the second seal assembly are hingedly mounted to the moveable flap.

A method of sealing, the method comprising: positioning a seal assembly within a gap, the seal assembly comprising a spring body including a first arm opposite a second arm, a distal end portion of the second arm including a skirt, wherein at least a portion of the spring body exerts a force to urge at least one of the first arm and the second warm away from the other, a clip pivotally coupled to a distal end portion of the first arm, and a wear shoe pivotally coupled to the clip; sealing the gap by contacting at least a portion of the second arm against a first surface defining the gap and contacting at least a portion of the wear shoe against a second surface defining the gap; and sealing an interior of the seal assembly by contacting at least a portion of the wear shoe with the clip and by contacting at least a portion of the clip with the skirt.

The method of any preceding clause, further comprising at least one of automatically pivoting the wear shoe about the clip in response to a movement in the second surface and automatically pivoting the clip about the distal end portion of the first arm in response to the movement in the second surface.

The method of any preceding clause, wherein the skirt is received by the clip, and wherein the method further comprises automatically moving the clip along the skirt to seal an interior space between the first arm and the second arm.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

The invention claimed is:

1. A seal assembly, comprising:
  a spring body, comprising:
    a first arm having a first proximal end portion and a first distal end portion, and
    a second arm opposite the first arm and defining an interior space therebetween, the second arm having a second proximal end portion coupled to the first proximal end portion and a second distal end portion, the second distal end portion including an elbow and a skirt extending away from the elbow and into the interior space;
    wherein at least a portion of the spring body exerts a force to urge at least one of the first arm and the second arm away from the other to seal a gap between a moveable flap and a stationary structure;
  a clip pivotally coupled to the first distal end portion of the first arm, the clip having an upper jaw and a lower jaw, the upper jaw and the lower jaw extending into the interior space and defining an opening therebetween configured to receive the skirt; and
  a wear shoe pivotally coupled to the clip.

2. The seal assembly of claim 1, wherein the seal assembly creates at least four sealing interfaces, the at least four sealing interfaces including at least two sealing interfaces at each side of the gap and at least two sealing interfaces interior to the seal assembly.

3. The seal assembly of claim 1, wherein the wear shoe engages the stationary structure at a first sealing interface, the first sealing interface sealing a space between the wear shoe and the stationary structure.

4. The seal assembly of claim 3, wherein the wear shoe includes a planar face to create a planar seal at the first sealing interface.

5. The seal assembly of claim 1, wherein the clip engages the wear shoe at a second sealing interface, the second sealing interface sealing a space between the clip and the wear shoe.

6. The seal assembly of claim 1, wherein the second arm engages the moveable flap at a third sealing interface, the third sealing interface sealing a space between the second arm and the moveable flap.

7. The seal assembly of claim 1, wherein the lower jaw of the clip engages the skirt at a fourth sealing interface, the fourth sealing interface sealing the interior space.

8. The seal assembly of claim 7, wherein the lower jaw of the clip slidingly engages the skirt at the fourth sealing interface.

9. The seal assembly of claim 1, wherein the clip further includes a c-shaped portion that couples the upper jaw to the lower jaw.

10. The seal assembly of claim 9, wherein the first distal end portion of the first arm includes a first knuckle and a second knuckle, and wherein the c-shaped portion has a curved outer surface configured to be matingly received by the wear shoe and a curved inner surface configured to matingly receive the first knuckle and the second knuckle.

11. The seal assembly of claim 1, wherein the first arm comprises a first branch and a second branch, and wherein a first knuckle is disposed on the first branch and a second knuckle is disposed on the second branch.

12. The seal assembly of claim 11, wherein the second arm comprises a third branch and a fourth branch, wherein a proximal end portion of the third branch is coupled to a proximal end portion of the first branch via a first u-shaped portion, and wherein a proximal end portion of the fourth branch is coupled to a proximal end portion of the second branch via a second u-shaped portion.

13. The seal assembly of claim 12, wherein the first arm includes a first cut-out disposed between the first branch and the second branch, and wherein the second arm includes a second cut-out disposed between the third branch and the fourth branch.

14. The seal assembly of claim 12, wherein the first u-shaped portion is spaced from the second u-shaped portion.

15. The seal assembly of claim 1, wherein the wear shoe is made of an abradable material.

16. The seal assembly of claim 1, wherein the seal assembly is assembled by:
coupling the upper jaw and the lower jaw of the clip to the skirt of the second arm;
compressing the first distal end portion of the first arm towards the skirt of the second arm;
rotating the clip such that at least one portion of the first distal end portion of the first arm aligns with the clip;
mounting the wear shoe onto the clip; and
releasing the first distal end portion of the first arm to engage the clip.

17. A gas turbine engine nozzle assembly, comprising:
a stationary structure;
a moveable flap adjacent the stationary structure; and
the seal assembly of claim 1 between the stationary structure of the gas turbine engine nozzle assembly and the moveable flap of the gas turbine engine nozzle assembly to seal a gap between the stationary structure of the gas turbine engine nozzle assembly and the moveable flap of the gas turbine engine nozzle assembly.

18. The gas turbine engine nozzle assembly of claim 17, wherein the seal assembly of the gas turbine engine nozzle assembly is a first seal assembly, the gas turbine engine nozzle assembly further comprising:
a second seal assembly disposed between the stationary structure of the gas turbine engine nozzle assembly and the moveable flap of the gas turbine engine nozzle assembly, the second seal assembly comprising:
a second spring body, comprising:
a third arm having a third proximal end portion and a third distal end portion, and
a fourth arm opposite the third arm and defining a second interior space therebetween, the fourth arm having a fourth proximal end portion coupled to the third proximal end portion and a fourth distal end portion, the fourth distal end portion including a second elbow and a second skirt extending away from the second elbow and into the second interior space;
a second clip pivotally coupled to the third distal end portion of the third arm, the second clip being configured to receive the second skirt; and
a second wear shoe pivotally coupled to the second clip,
wherein the second seal assembly is positioned a predetermined distance from the first seal assembly.

19. The gas turbine engine nozzle assembly of claim 18, wherein the spring body of the first seal assembly includes at least one projection along a peripheral edge thereof, the at least one projection separating the first seal assembly from the second seal assembly by the predetermined distance.

20. The gas turbine engine nozzle assembly of claim 18, wherein the first seal assembly and the second seal assembly are hingedly mounted to the moveable flap of the gas turbine engine nozzle assembly.

* * * * *

UNITED STATES PATENT AND TRADEMARK OFFICE
CERTIFICATE OF CORRECTION

| | |
|---|---|
| PATENT NO. | : 11,655,722 B1 |
| APPLICATION NO. | : 17/578717 |
| DATED | : May 23, 2023 |
| INVENTOR(S) | : Dale Szul et al. |

It is certified that error appears in the above-identified patent and that said Letters Patent is hereby corrected as shown below:

In the Drawings

Replace FIG. 1 with the attached Replacement Sheet of FIG. 1, which switches the "FORE" and "AFT" labels on the reference arrow at the bottom of FIG. 1.

Signed and Sealed this
Third Day of October, 2023

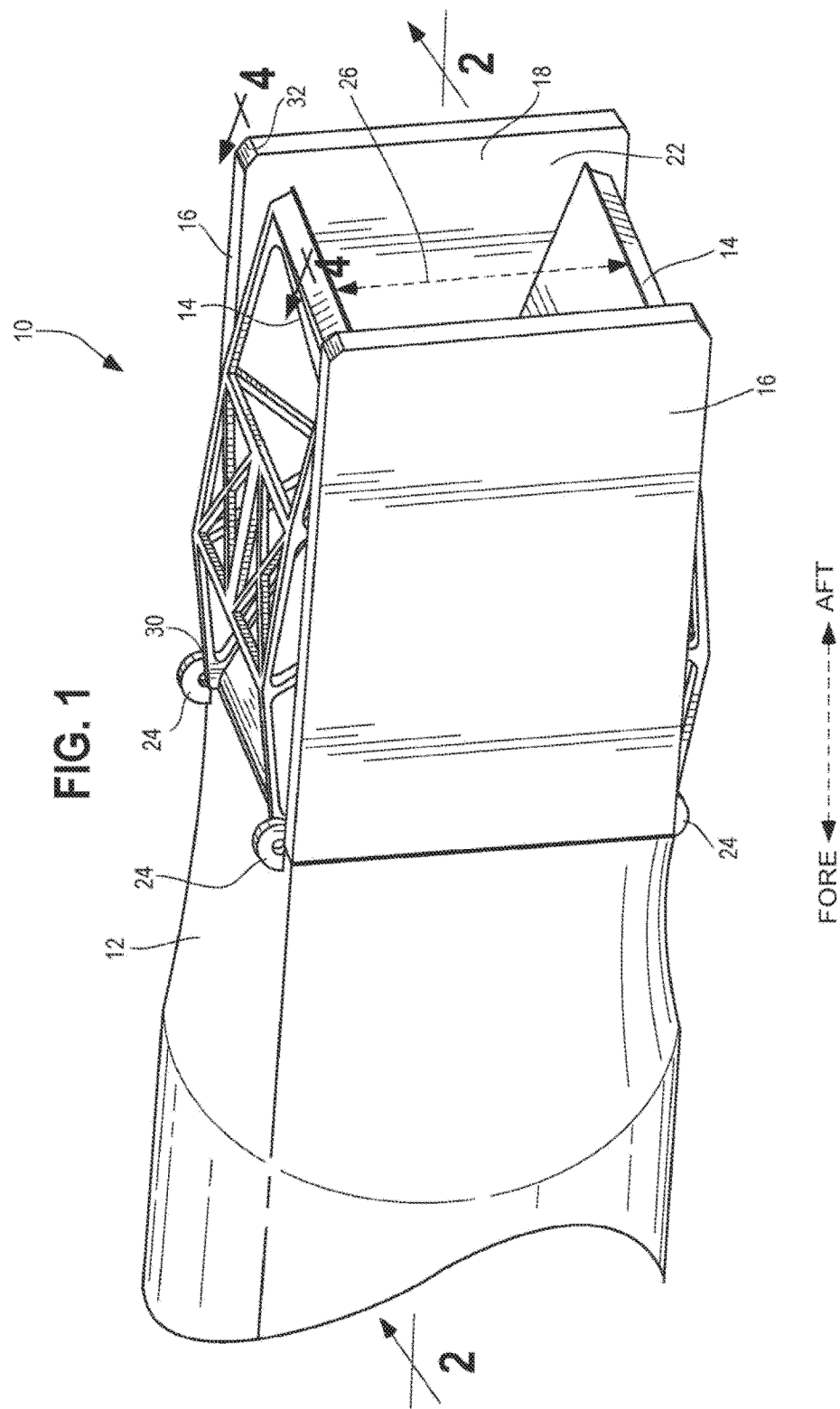

Katherine Kelly Vidal
*Director of the United States Patent and Trademark Office*